United States Patent [19]

Di Santo et al.

[11] Patent Number: 4,742,345
[45] Date of Patent: May 3, 1988

[54] ELECTROPHORETIC DISPLAY PANEL APPARATUS AND METHODS THEREFOR

[75] Inventors: Frank J. Di Santo, North Hills; Denis A. Krusos, Lloyd Harbor, both of N.Y.

[73] Assignee: Copytele, Inc., Huntington Station, N.Y.

[21] Appl. No.: 799,458

[22] Filed: Nov. 19, 1985

[51] Int. Cl.⁴ .............................................. G09G 3/34
[52] U.S. Cl. .................................. 340/787; 340/783; 340/752; 350/267
[58] Field of Search ............... 340/787, 788, 792, 718, 340/801, 811, 812, 813, 814

[56] References Cited

U.S. PATENT DOCUMENTS

| | | | |
|---|---|---|---|
| 3,972,040 | 7/1976 | Hilsum et al. | 340/787 |
| 4,041,481 | 8/1977 | Sato | 340/787 |
| 4,176,917 | 12/1979 | Yasutake | 340/815.04 |
| 4,266,225 | 5/1981 | Burnett et al. | 340/801 |
| 4,450,440 | 5/1984 | White | 340/787 |
| 4,574,280 | 3/1986 | Weber | 340/718 |
| 4,636,785 | 1/1987 | Le Pesant | 340/787 |

Primary Examiner—Gerald L. Brigance
Attorney, Agent, or Firm—Arthur L. Plevy

[57] ABSTRACT

Electrophoretic display panel apparatus having improved alignment and contrast characteristics and methods therefor is provided in accordance with the teachings of the present invention. According to a first aspect of the invention a display panel having a plurality of rows of cathodes and a plurality of perpendicularly disposed grid conductors is provided. Each grid conductor is formed as a plurality of commonly connected parallely disposed lines formed on an insulating tine structure to enable the thickness of each conductor and tine to be adjusted for optimum contrast characteristics and to ensure that the requisite number of intersections are provided between rows and columns even should slight misalignment therebetween occur. According to a second aspect of the instant invention the resulting display panel is mounted in a frame having connecting pads corresponding to similarly disposed pads associated with each column and row conductor within the panel formed to enable connection therebetween to be achieved. However, electrical connections for the conductive pads within the frame are provided through selectively actuatable delay means so that if misalignment between a column or row conductor and a corresponding pad within the frame occurs a signal applied to the connector pad within the frame may be delayed to correct any resulting misalignment.

43 Claims, 7 Drawing Sheets

ELECTROPHORETIC DISPLAY PANEL APPARATUS AND METHODS THEREFOR

BACKGROUND OF THE INVENTION

This invention relates to electrophoretic display panel apparatus and methods therefor and more particularly electrophoretic display panel apparatus having improved contrast and image alignment.

In U.S. patent application Ser. No. 670,571 entitled "Electrophoretic Display Panels And Associated Methods" as filed on Nov. 13, 1984 in the names of Frank J. DiSanto and Denis A. Krusos and assigned to the assignee of the instant application there is disclosed an electrophoretic display panel capable of exhibiting resolution characteristics of 200 lines per inch. This display panel is typically configured as an $8\frac{1}{2} \times 11$ flat panel having a depth of less than 2 inches. Such a panel is highly advantageous in that the resolution displayed thereby equals or exceeds many CRT's, the display exhibits hysteresis so that it need not be constantly refreshed or maintained in an energized condition and the reflective characteristics thereof readily accommodate xerographic printing or hard document production techniques.

Since the depth of such a panel is quite small when compared to standard CRT display devices, it will be seen that the same completely alleviates the space problems associated with conventional personal computer, display terminal or work station installations where the size of the CRT display is often the largest item involved especially when it is considered that hardware elements such as printers and CPU's may often be remotely located. Thus, such a flat panel display occupies little more space than a picture frame or typing stand so that the same may readily be incorporated into existing work stations or desk areas without overwhelming the work area. Furthermore, if such a display is hinged to a document location input of a xerographic copier or the like, silent printing stations may be achieved without any specialized input or writing section therefor such as now conventionally provided by laser printers and the like. The provision of separate panel displays near an operator and at a copier also facilitates the creation of silent, attractive word processing or data processing installations which are small in size so that the same may be readily incorporated into pre-existing work areas.

As described in greater detail in the above-identified patent application, the electrophoretic display described therein generally takes the form of a wafer structure formed on a glass sheets generally slightly larger than the size of the panel. The glass sheet is coated with indium-tin oxide (ITO) having a horizontal cathode line pattern etched therein to form horizontal row conductors. In the case of an $8\frac{1}{2} \times 11$ inch panel having a resolution of 200 lines per inch there will be 2,200 horizontal rows of conductors forming the horizontal cathode line pattern. Since the ITO layer is very thin those of ordinary skill in the art will appreciate that it is relatively transparent. An insulating layer formed by photoresist such as phenolic resin impregnated with photoactive material is deposited over the cathode line structure. Thereafter, the photoresist material is overcoated with a nickel layer through the use of sputtering techniques or the like and then the nickel is overcoated by another thin layer of photoresist material.

Once the solid nickel layer sandwiched by solid layers of photoresist material is formed over the horizontal cathode rows formed in the ITO, a mask having vertically disposed column conductors is placed on the top layer of photoresist and thereafter the wafer formed is exposed to ultraviolet light and developed. Where the photoresist material has been exposed to ultraviolet light the same will be removed leaving vertically disposed columns of photoresist overcoating the nickel layer together with adjacent vertical columns of nickel from which the photoresist has been removed. The nickel is then etched so that nickel material which is not overcoated by photoresist is removed. Subsequently, the wafer structure is flooded with ultraviolet light and again developed so that the vertical layers of photoresist overlying the remaining vertical strips of nickel are removed. Once this is done the wafer is placed in a plasma etcher which effectively removes all photoresist material which is not overcoated by nickel so that columns of vertically disposed nickel conductors which act as grids in the triode structure being formed remain. If a panel display having dimensions of $8\frac{1}{2} \times 11$ inch and a resolution of 200 lines per inch is again considered it will be appreciated that 1,700 vertical columns consisting of 1,700 grid lines are required.

Because the electrophoretic phenomena employs what is in effect the migration of pigment particles, early attempts at creating such devices sought to control migration about the cathode or the intersection of the cathode and grid conductors to form a display. Thus, typically pigment particles would migrate toward and away from the intersection of the cathode and grid conductors to form display elements about the periphery of such intersections it being noted that while cathode conductors such as the row conductors here described would typically be sufficiently thin to be transparent grid conductors could not be made to change color. Further efforts to improve the manner in which grid conductors would control the migration of pigment particles involved an aperturing of such grid conductors as disclosed in U.S. patent application Ser. No. 670,571, as aforesaid, and shown for instance in U.S. Pat. No. 4,203,106 which issued to Daliasa et al. on May 13, 1980 and is assigned to North American Phillips Corporation. When the grid structure is apertured much greater control of the voltage gradient at locations where the pigment particles and the grid interact is available and under these conditions contrast and resolution may be enhanced.

An aperturing of the grid conductors, however, is quite difficult becuse while photoetching or engraving techniques such as described above are eminently well suited and capable of causing straight line segments which can be extremely thin to be formed, the same do not work especially well when it is desired to form apertured conductor lengths or the like. Furthermore, when such conductors are apertured only in the area of the intersection with the cathode row conductors any misalignment in the area of the intersection will result in a substantial loss of the voltage gradient control characteristics being sought. Such a situation, it will be appreciated, can be a great problem where the electrophoretic display panel being formed is configured to correspond in size to a normal page such as here indicated as comprising an $8\frac{1}{2} \times 11$ inch display and exhibits high resolution characteristics such as a 200 line per inch level described in U.S. patent application Ser. No. 670,571. In such a display it will be recalled 2,200 horizontal row conductors and 1,700 vertical column conductors are employed in forming the cathode grid matrix and hence appropriate alignment at the 3,740,000 intersections which result can be a substantial problem.

Once the vertically disposed grid structures are formed in the column direction, the electrophoretic panel is completed by forming an enclosing anode structure which may typically be formed of ITO in such manner as described in connection with U.S. patent application Ser. No. 670,571. The anode structure encloses the cathode-grid structure described above and provides an area in which a fluid containing appropriate electrophoretic pigment particles which have been charged may be enclosed. Thereafter, charged pigment particles dispersed in a dielectric fluid to form an electrophoretic dispersion are inserted into the cell and the resulting structure is enclosed within a frame or the like through which electrical connection to the individual grid and cathode conductors is provided.

In the case of the $8\frac{1}{2} \times 11$ inch electrophoretic panel display described above such a frame structure must typically provide individual connection to 2,200 cathode lines and 1,700 grid lines although, as will be apparent to those of ordinary skill in the art, a converse allocation may be employed. Because so many tiny conductors are involved, it is advantageous to provide adjacent conductors in each column and row with contact or connection pads brought out to the periphery of the panel in such a manner that adjacent conductors are brought out to opposite sides of the panel in an interleaved fashion. Thus typically, odd numbered row conductors are brought out to the right while even numbered row conductors are brought out to the left. In similar fashion odd numbered column conductors are brought out to the top while even numbered column conductors are brought out to the bottom. This effectively doubles the space available for a connection. Complementary connection pads are provided within the frame employed to house the panel and provide electrical connection thereto. Interconnection of pads on the frame and on the panel may be conveniently supplied through the use of Zebra strips or the like as the same readily avoids shorting.

Even under conditions where only half the row and column conductors are brought out to each side and the top and bottom of the panel being formed, it will be seen that under the conditions set forth above 1,100 row conductors are present on each side of the panel while 850 column conductor pads are present at the top and bottom portions of the panel. These in turn must be connected to an equal number of corresponding located connector pads in the frame. If it is assumed that an unreasonable amount of area is not to be provided for location of this large number of connector pads about the periphery, it will be seen that the connector pads involved cannot be extremely large and in actual devices tend to be approximately 0.375 inches by 0.005 inches. Thus, when the display panel is inserted into the frame it is not unusual that misalignment between connecting pads occurs so that, for example, the connector pad in the frame associated with row 3 is connected for example to the connector pad on the panel associated with row 1 or the like. This, it will be appreciated, will result in substantial misalignment of the image information being formed on an operating display as in effect, information intended to be written on row 3 of the display is effectively written into row 1 and row 1 information is omitted. Furthermore, since the display panel and mounting frame are typically rectangular, misalignment on a given side will frequently result in misalignment on the top and bottom so that effectively image rotation will occur.

While misalignment problems of the foregoing type may sometimes be minimized through the use of very tight manufacturing tolerances on the panel and frame together with the inclusion of locating pins or, alternatively, etching or painting indicia on the panel and frame and providing an assembly fixture, such solutions results in an untoward increase in manufacturing costs and are frequently not usable under condictions of field replacement or repair. Thus, to maintain very tight manufacturing tolerances on the panel and frame and including locating pins therein will result in mated pairs which are extremely costly to produce and would preclude a replacement of only an individual frame or panel in the field. Similarly, etching or painting indicia on the panel and frame and providing an assembly fixture therefor would impose a requirement that such fixture include precise optics to perform the required alignment so that such a fixture could not be utilized in the field and would be disproportionately costly in a manufacturing environment.

Accordingly, from the foregoing, it will be recognized that if practical and commercially viable electrophoretic display panels are to become a significant factor in the marketplace, alignment problems associated both with the structure of the grid electrodes in triode forms of these devices and with the mounting of the resulting panel formed into a housing to supply column and row information thereot must be solved. In addition, even with devices exhibiting extremely high resolution such as the 200 line per inch resolution described above, techniques for optimizing contrast must be developed.

Therefore, it is a principle object of the present invention to provide electrophoretic display panel apparatus having improved alignment characteristics and methods therefor.

A further object of this invention is to provide electrophoretic display panel apparatus have improved contrast characteristics and methods for allowing the contrast exhibited by such panels to be optimized.

An additional object of the present invention is to provide electrophoretic display panel apparatus and methods therefor wherein individual grid electrode structure is tinted in appearance and permits the formation of reservoirs for electrophoretic particles intermediate such tines.

A further object of the present invention is to provide electrophoretic display panel apparatus having an adjustable delay line structure which is operable to correct misalignment of the panel within a mounting frame or the like.

Another object of the present invention is to provide electrophoretic display panel apparatus and methods therefore wherein each grid electrode includes a plurality of parallel conductors in the form of tines so that appropriate intersections with cathode conductors will occur even if minor misalignment between an array of row conductors in the form of cathodes and an array of grid electrodes occurs.

An additional object of the instant invention is to provide electrophoretic display panel appartus and methods therefor wherein the grid electrodes take the form of a plurality of parallel tines each tine having width characteristics which may selectively vary to optimize contrast conditions exhibited by the display apparatus.

Various other objects and advantages of the present invention will become clear from the following detailed description of an exemplary embodiment thereof and the novel features will be particularly pointed out in conjunction with the claims appended hereto.

SUMMARY OF THE INVENTION

In accordance with the teachings of the present invention electrophoretic display panel apparatus having improved alignment and contrast characteristics and methods therefor are provided wherein, according to a first aspect of the invention a display panel having a plurality of rows of cathodes and a plurality of perpendicularly disposed grid conductors are provided and each grid conductor is formed as a plurality of commonly connected parallely disposed lines formed on an insulating tine structure to enable the thickness of each conductor and tine to be adjusted for optimum contrast characteristics and ensure that the requisite number of intersections are provided between rows and columns even should slight misalignment therebetween occur; and according to a second aspect of the instant invention the resulting display panel is mounted in a frame having connecting pads corresponding to similarly disposed pads associated with each column and row conductor within the panel formed to enable connection therebetween to be achieved; however, electrical connections for the conductive pads within the frame are provided through selectively actuatable delay means so that if misalignment between a column or row conductor and a corresponding pad within the frame occurs a signal applied to the connector pad within the frame may be delayed to correct any resulting misalignment.

BRIEF DESCRIPTION OF THE DRAWINGS

The invention will be more clearly understood by reference to the following detailed description of an exemplary embodiment thereof in conjunction with the drawings in which.

DETAILED DESCRIPTION

Figure 1:
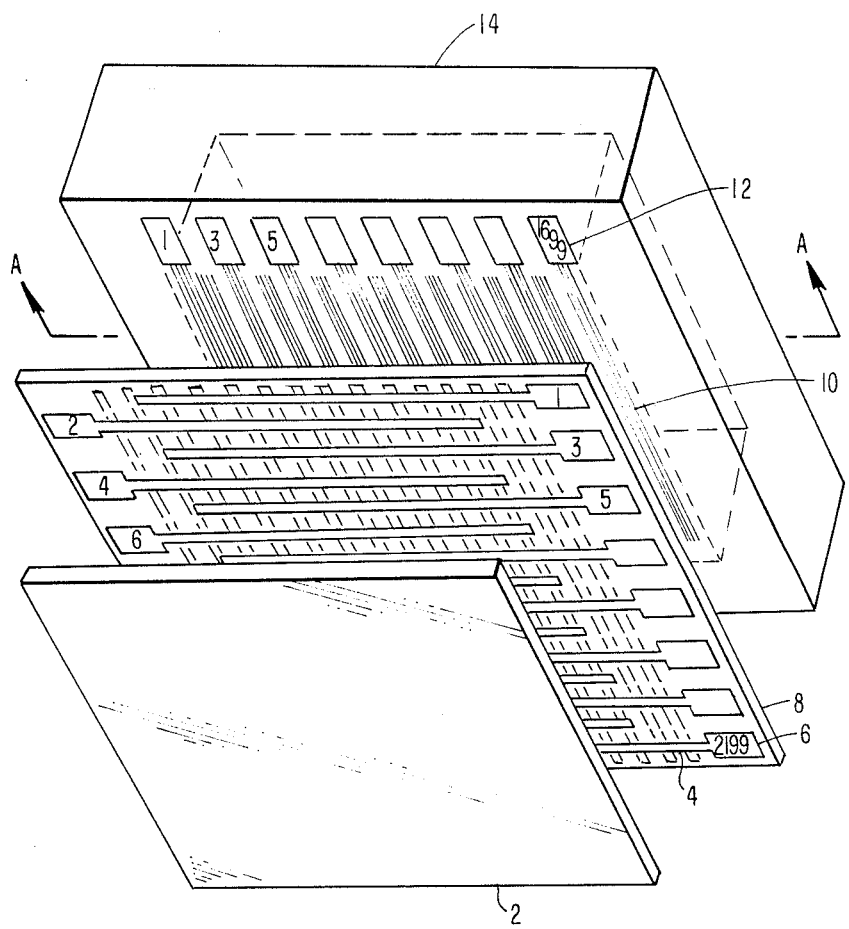
FIG. 1 is an exploded view of electrophoretic display panel apparatus according to the teachings of the present invention.
Figure 3:
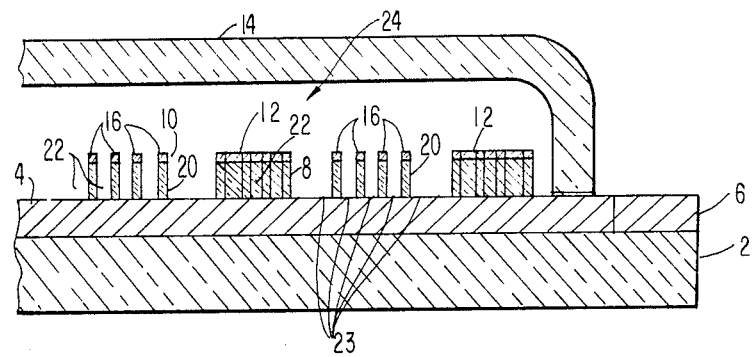
FIG. 3 is a front view, partially in section, illustrating a portion of the electrophoretic display panel apparatus shown in FIG. 1.
Figure 4:
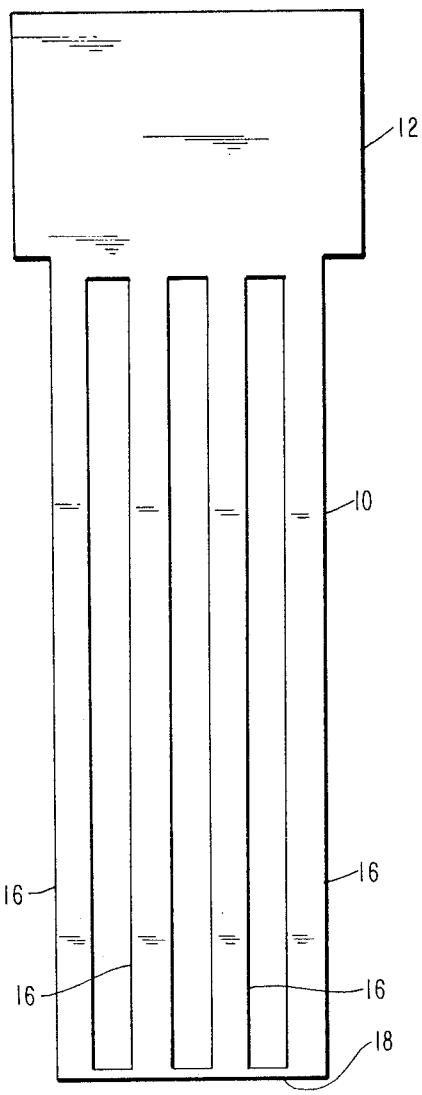
FIG. 4 is an enlarged top view showing exemplary tine column conductor structure according to the instant invention.

Referring now to FIG. 1 there is shown an exploded view of electrophoretic display panel apparatus according to the teachings of the present invention. The electrophoretic display panel apparatus illustrated in FIG. 1 comprises a glass plate 2, a plurality of row conductors 4 having contact pads 6, a photoresist layer 8, a plurality of column conductors 10 having contact pads 12 and an anode 14. The exploded view of the electrophoretic display panel apparatus illustrated in FIG. 1 has been shown substantially out of scale for purposes of illustrating the wafer arrangement formed and similar manner the presence of the photoresistive layer 8 has been simply shown in FIG. 1 as a layer of material to facilitate ease of illustration. Such representation while plainly conveying an appreciation of the wafer structure formed in not wholly accurate and for this reason reference to FIGS. 3 and 4 which are not to scale but structurally precise should take place to fully acquaint the reader with the structure set forth. In FIGS. 3 and 4 common reference numerals to those employed in FIG. 1 have been adopted for common subject matter. It should be noted that FIG. 3 is a front view, partially in section, illustrating a portion of the electrophoretic display panel apparatus shown in FIG. 1 while FIG. 4 is an enlarged top view showing an exemplary one of the plurality of column conductors 10 and contact pads 12.

The glass plate 2 acts to provide a port through which a viewer of the display may discern image information set forth thereon. The glass plate 2 is preferably coated with an extremely thin layer of indium-tin-oxide (ITO) as available as described in the aforesaid U.S. patent application Ser. No. 670,571 from many suppliers. The layer of ITO is relatively thin approximately in the range of 300 angstroms in thickness so that the glass plate 2 retains its relatively transparent characteristics. The plurality of row conductors 4 and their associated contact pads 6 while illustrated in the exploded view of FIG. 1 as residing on the photoresist layer 8 are in fact best shown in FIG. 3 as etched from the ITO layer overcoated on the glass plate 2. This may be achieved, as will be readily appreciated by those of ordinary skill in the art, through conventional photoetching or engraving techniques wherein a physical mask bearing respresentations of the plurality of conductors 4 and contact pads 6 is employed to form a image of the plurality of row conductors 4 and contact pads 6 on the glass plate 2 and thereafter portions of the ITO coating not corresponding to the image are removed.

More particularly, the glass plate 2 bearing the ITO layer may be initially overcoated with a photoresistive layer of any conventional form and thereafter a mask having the conductor pattern associated with the plurality of row conductors 4 and contact pads 6 is placed on the photoresistive layer formed. The glass plate is then exposed to ultraviolet light through the mask and developed. When remains will be a conductor pattern corresponding to that illustrated in FIG. 1 for the plurality of row conductors 4 and the contact pads 6 wherein each conductor and pad will be overcoated by photoresistive material. The remaining ITO will be exposed in that the same will not be overcoated with photoresistive material. Once this is achieved the ITO layer may be etched using conventional etching techniques so that only ITO material overcoated by photoresistive material which corresponds to the mask employed in the exposure step remains. Thereafter, the entire glass plate 2 is again exposed to ultraviolet light without the benefit of the mask so that the photoresistive material on top of the ITO row conductor pattern formed, as shown in FIG. 1, is now exposed. Upon development, this photoresistive material is removed leaving the pluraltiy of row conductors 4 having contact pads 6 illustrated in FIG. 1 on the backside of the glass plate 2. Inspection of FIG. 3 will readily reveal that this conductor pattern is effectively formed on the back of the glass plate 2 rather than on the layer of photoresistive material 8 illustrated in FIG. 1. Furthermore, those of ordinary skill in the art will also appreciate that while the glass plate 2 has been illustrated slightly smaller than the photoresistive layer 8 illustrated in FIG. 1 effectively, this may be reversed since the row conductors 4 and the contact pad 6 are formed on the glass plate 2 and it is desired to make the contact pads 6 available at the outside of the wafer formed. This has been reversed in FIG. 1 to accommodate the illustration set forth therein.

As shall be seen hereinafter the electrophoretic display panel apparatus described herein is a triode type device employing descrete cathode, grid, and anode structure. Thus while diode type arrangements are available, a triode form of the device is preferred since use of independent grid structures allows a ready threshold to be established which enables electrophoretic particles which are charged to displace to and from wells formed at the intersection, as shall be seen below, of the cathode and grid structures toward and away from the anode 14. The plurality of row conductors 4 and their contact pads 6 are utilized herein as cathode elements which are selectively provided with a potential of approximately 0 volts when the row defined thereby is to be written. Thus, as shall also be seen below, when data corresponding to the information for one row is selectively applied in terms of 1's and 0's to each column driver the single row conductor 4 defining a row to be written is referenced to zero potential causing electrophoretic material to progagate toward or away from the wells associated with each intersection of that row with each column driver depending upon whether or not a 1 or a 0, i.e. +7.5 volts or −7.5 volts is applied to the column driver in question. The electrophoretic materials, as more fully described in U.S. patent application Ser. No. 670,571, are pigment particles having a different color than the fluid within the electrophoretic display panel. Therefore, the intersection which is viewable through glass plate 2 will change color depending upon whether or not pigment particles reside in the well or have been displaced therefrom. The electrophoretic display panel apparatus illustrated in FIG. 1 is similarly configured to be a high resolution 8½×11 inch display of the type described in the aforesaid U.S. patent application Ser. No. 670,571 and for this reason a portion of the glass plate 2 upon which image information is displayed will exhibit an active area of approximately 8½×11 inches.

The display illustrated in FIG. 1 is also a high resolution display of the type described in U.S. patent application Ser. No. 670,571 and employs each of the materials and basic modes of electrophoretic operation described therein. This means that the display illustrated in FIG. 1 will exhibit resolution of 200 lines per inch. Hence while only a relatively few row conductors 4 and their associated pads 6 are illustrated in FIG. 1, those of ordinary skill in the art will appreciate that assuming the active area of the display is 8½ inches wide and 11 inches long there will be 2,200 horizontally disposed cathode or row conductors 4 etched on the back surface of the glass plate 2. For this reason as illustrated in FIG. 1, contact or connection pads 6 for each row are brought out to opposite sides of the display such that contact pads for rows 1, 3, 5 . . . 2199 are brought out to the right side of the display while contact pads 2, 4, 6 . . . 2200 are brought out to the left side of the display. Those of ordinary skill in the art will readily appreciate that this interleaving of the connection pads 6 for the row conductors is done for the practical purpose of increasing connection space on the display and should smaller number of row or cathode conductors be involved such interleaving would be unnecesary. Those of ordinary skill in the art will also appreciate that while resolution of 200 lines per inch is viewed as highly desirable since the same at least equals or exceeds the majority of CRT displays available today, specific resolution characteristics set forth may be varied to suit the choice of the designer.

Since FIG. 1 has purposely not been drawn to scale it may also be noted that in actual embodiments of this invention which have been built and tested, the width of each of the row conductors 4 formed from the 300 angstrom coating of ITO was typically of the order of 112 um while separation between adjacent row conductors was 15 um. The length of each row conductor was typically 9 inches and each of the pads 6 took the form of a rectangle having dimensions of ⅜ of an inch by 0.005 of an inch. Quarter inch spacing was also provided between the end of each row condcutor and the connection pad 6 associated with the adjacent row conductor.

While the plurality of row conductors 4 and their associated contact pads 6 are illustrated in FIG. 1 as disposed upon the photoresistive layer 8 reference to FIG. 3 will readily reveal that in fact the row conductors are etched as aforesaid on the ITO layer formed on the glass plate 2. In fact, the entire wafer being described herein is built up using the glass plate 2 as a base as depicted in FIG. 3. Such a showing, however, could not be facilitated in the exploded view represented in FIG. 1. The photoresistive layer 8 is actually deposited as will be appreciated by those of ordinary skill in the art over the row conductors 4 formed on the glass plate 2 once the row conductors 4 and contact pads 6 have been formed in the manner described above. Furthermore, as will be appreciated, while the contact pads 6 illustrated in FIG. 1 are shown on the photoresistive layer 8, the same in fact are preferably not overcoated with photoresistive material and are left exposed in the manner clearly shown in FIG. 3 so that the same are available for connection without processing to remove photoresistive material. At any rate, once the plurality of row conductors 4 and their associated contact pads 6 are etched from the ITO layer the entire area of the row conductors is overcoated with a photoresistive material. The photoresistive material may typically take the form of phenolic resin impregnated with photoactive material.

Thereafter, the photoresistive layer 8 is overcoated with a thin layer of nickel in the same manner described in connection with U.S. patent application Ser. No.

670,571 and it is from this layer that the plurality of vertical conductors 10 and associated contact pads 12 are formed. The thin layer of nickel overcoated on the photoresistive layer 8 may be formed using conventional sputtering techniques well-known to those of ordinary skill in the art. Once the thin layer of nickel is applied to the photoresistive layer 8 a second photoresistive layer is formed over the nickel so that the plurality of vertically disposed conductors 10 which form grid electrodes and their associated contact pads 12 may be formed through conventional etching techniques.

Upon the formation of the photoresist-nickel-photoresist sandwich on the plurality of row conductors 4, conventional etching techniques may be employed to form the plurality of column conductors and their associated contact pads 12. Each of the column conductors 10 and their associated pads 12 will take the form of a tine like structure typically illustrated in FIG. 4 which shows an exemplary tine column conductor structure according to the instant invention. More particularly, each column conductor as best seen in FIG. 4 will comprise contact portion 12 which may be dimensioned in a manner which corresponds to the dimensions of the contact portion 6 or, alternatively, any other convenient dimension may be employed. However, rather than solid or selectively apertured column conductors, the structure here employed for the column conductors 10 takes the form of a plurality of parallel conductor members 16 shown in FIG. 4 which are connected in parallel by the contact pad 12 and an interconnecting conductor portion 18. In FIG. 4, four individual parallel conductor members 16 for each column conducor have been illustrated; however, those of ordinary skill in the art will appreciate that a greater or lesser number of parallel conductor members may be employed to facilitate design requirements and, more particularly, the contrast requirements of the display being designed due to the presence of the wells established.

The use of grid conductors 10 having multiple conductor members 16 is viewed as highly advantageous for two basic reasons. The first is that, as shall be seen below, wells for electrophoretic material are established between the conductor members 16 as well as about the periphery. This means, as will be appreciated by those of ordinary skill in the art, that displays provided with such grid structure may be designed to exhibit desired contrast characteristics. This occurs since the nickel conductor members employed will not change color when electrophoretic material is present or removed from the well and hence the thicker the grid member 10 is the less contrast will be exhibited. However, those of ordinary skill in the art will appreciate that in the areas of intersection a substantial voltage gradient must be established to cause the electrophoretic pigment particles to migrate from and to wells established.

Prior attempts to create desired gradient characteristics at the intersection have involved the selective aperturing of conductors in the area of the intersections. However, this cannot be easily achieved with conventional photomask etching techniques as the same is much better suited to the creation of straight line conductors and the like. Furthermore, when column conductors are selectively apertured in the areas of intersection misalignment problems may occur and if aperture portions of vertical or grid conductors do not overlie cathode or row conductors at the intersections the intersections and hence electrophoretic particle propagation in the area of each intersection will be adversely effected. It will be seen, however, that when a tined conductor such as illustrated in FIG. 4 is employed the 4 parallel conductor members associated therewith will in fact always intersect each row even if a slight misalignment occurs. Thus, when misalignment is present while an intersection which is slightly skewed in location may result no loss of the character information or the switching characteristics at the intersection will result.

In an actual embodiment of the invention which was built and tested vertical column conductors having four conductor members 16 were employed and designed for maximum contrast. Maximum contrast under these conditions is a condition which occurs when a minimum of the column conductor is involved which establishes a requisite potential gradient at the intersection. A potential gradient required to achieve appropriate electrophoretic particle propagation speeds typically ranges from 1.5 to 3 million volts per meter and the same must be established through an application of 15-20 volts to the column conductors. Therefore, it will be seen that the widths for the conductor member 16 may be readily calculated since the micron spacing between the grid formed by the conductor 10 and the anode 14 is known. In the embodiment of the invention which was built and tested each conductor member 16 employed in a given column conuctor 10 had a width of from 10-15 um while the spacing therebetween was typically 20 um. The length of each conductor member 16 was typically 11 ¾ inches it being noted that the interconnecting contact portion 18 had a length of 112 um and a height of approximately ⅛ of an inch.

The plurality of column conductors 10 having contact pads 12 are formed in the nickel layer sputtered on the photoresistive layer 8 in much the same way as the row conductors 4 were formed. More particularly, a mask having the column conductor pattern illustrated in FIG. 1 is placed on top of the photoresistive-nickel-photoresistive waver previously described as formed on top of the row conductors 4. The sandwich is then exposed to ultraviolet light through the mask and developed This will cause portions of the photoresistive layer overlying the nickel to be removed in areas where the mask is not present. Thus, the column conductor pattern illustrated in FIG. 1 is formed with photoresistive material overlying the contact pads 12 and each of the conductor members 16 within each conductor 10. The top layer of photoresist will be removed from the nickel in the developemnt in all other areas. In this regard it should also be noted that the technique of providing odd column contact pads to the top of the display while even column contact pads are provided at the bottom of the display, in much the same manner as described for the row contact pads 6, is again employed to increase available space for connecting the contact pads 12.

Once development has taken place, the nickel is then etched so that all portions of the nickel layer not covered by photoresist are removed. This will then leave the conductor pattern illustrated in FIG. 1 for the vertical conductors 10 present wherein each conductor 10 and pad 12 is covered with photoresist overlying a nickel layer which in turn overlies a layer of photoresist while other areas have only the original photoresist layer 8 remaining. The original photoresist layer 8, it may be noted, will have been hardened after the same was applied so that the same will not be removed by standard development techniques. Once this has occurred the surface is flooded with ultraviolet light and developed so that the photoresist overlying the nickel which remains is removed. After this is done the surface is placed is a plasma etcher which is here employed, in a manner well-known to those of ordinary skill in the art, to remove all portions of the hardened base layer of photoresist 8 not having nickel disposed thereon. Once this is done the result, best illustrated in FIG. 3, is achieved.

More particularly, as shown in FIG. 3 upon the completion of the step just described the row conductors 4 will have disposed thereon a tine arrangement wherein each of the 4 tines 16 and the contact pad 12 of the column conductor formed of nickel is mounted on corresponding tines 20 of photoresistive material formed of the layer 8 and each contact pad 12 resides on corresponding size portion of photoresist 8. It should be noted that in FIG. 3 a section has been taken through AA to better show the tine arrangement formed. Those of ordinary skill in the art will appreciate that a well is effectively formed at the surface of each row conductor 4 intermediate each tine of photoresist 20 underlying a conductor member 16 as well as adjacent thereto. Exemplary well locations for electrophoretic material are illustrated in FIG. 3 by the reference numerals 22.

An inspection of FIG. 3 will render it immediately apparent that the propagation of electrophoretic pigment particles into and out of the wells 22 formed at the intersections of the column conductors 10 and each row conductor 4 will achieve a marked increase in contrast. This occurs since each row conductor 4 is formed of ITO and has a thickness of approximately 300 angstroms so that the same is transparent for all practical purposes while, each column conductor 10 and, more particularly, the 4 tine portions thereof 16 establish 5 well associated with each column conductor in which color change will occur as a result of the propagation of electrophoretic particles. This is to be distinguished from the case of a solid conductor 10 wherein wells are only established at either side of the conductor or an apertured conductor which does not provide wells of equal uniformity. Furthermore, loss of contrast at the intersection associated with a slight misalignment as may occur with an apertured conductor here will not result because 5 distinct wells are established at each intersection even if a slight misalignment between a row and column conductor occurs. Thus, it will be appreciated that the unique tine structure employed in forming the column conductors 10 enables the electrophoretic display panel illustrated in FIG. 1 to exhibit optimized contrast characteristics while avoiding loss of image information associated with particular intersections of the row and column conductors 4 and 10 due to possible minor misalignment of one of such conductors. If it is assumed that a resolution of 200 lines per inch is being sought, it will be appreciated that 1,700 row conductors would be employed in the illustrative display panel apparatus shown in FIG. 1.

The anode structure 14 as illustrated in FIGS. 1 and 3 may take the form of glass plate or the like which is coated with ITO material. In FIG. 3 the anode is shown curving down to the surface associated with the row conductor 4, however, those of ordinary skill in the art will appreciate that it is only the inner surface of the anode 14 which is parallel to the array of column and row conductors that is made conductive while the side surfaces thereof are not conductive nor energized and are employed solely for the purposes of providing a fluid tight chamber above the electrodes. Thus, essentially a hollow cavity 24 is formed over the row and column electrodes 4 and 10 for purposes of retaining electrophoretic pigment particles disposed within a suitable fluid medium which is preferably dielectric in character. More particularly, once the anode 14 is formed ion the display panel, the cavity 24 is filled with an electrophoretic suspension which comprises any of the dielectric liquids and charged electrophoretic particles described in U.S. patent application Ser. No. 670,571.

A typical solution which has proved to be highly advantageous comprises 4% of AAOT yellow, 0.16% of CENTROLEX P, 80.51% of tetrachloroethylene and 15,3% of a hydrocarbon such as Aromatic 150 sold and distributed by Exxon Company and 0.03% of Sudan Black dye. When this is done the display will appear dark grey except at locations where charge is impressed. In these regions graphic yellow image portions upon a black or dark grey background will be formed providing a bright, effective and clear display. Those of ordinary skill in the art will realize that the display may be formed either at the glass associated with the cathode or that of the anode depending upon the nature of the charges impressed on the electrophoretic particles. Fluid tight enclosure 24 may be formed by the anode through conventional bonding techniques well-known to those of ordinary skill in the art.

Once the electrophoretic display panel apparatus according to the instant invention as shown as described in connection with FIGS. 1, 3 and 4 has been assembled the same may be mounted in a frame structure in which the same is securely retained. The frame structure will typically contain contact pads for supplying electrical signals to the contact pads 6 and 12 on the display together with conventional interface and control logic for supplying image information obtained, for instance, from a character generator ROM in a word processing station or the like to the display.

Figure 2:
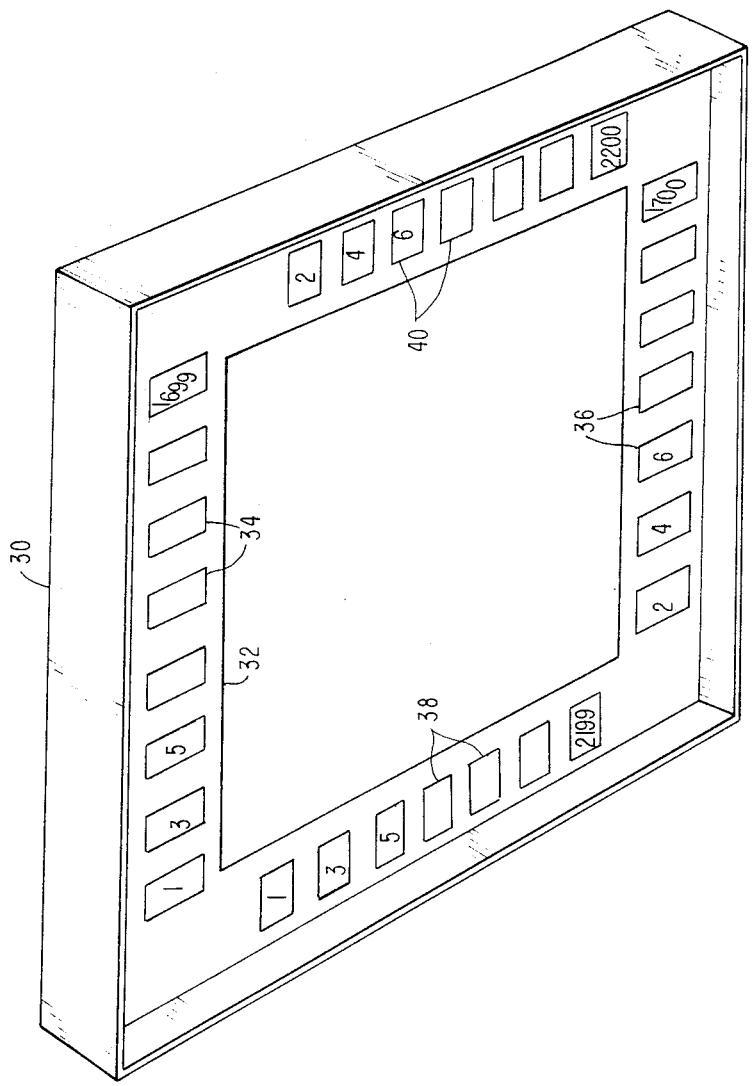
FIG. 2 is a pictorial view illustrating frame structure suitable for mounting the electrophoretic display panel apparatus shown in FIG. 1 and, more particularly, the arrangement of the contact pads therein.
Figure 5:
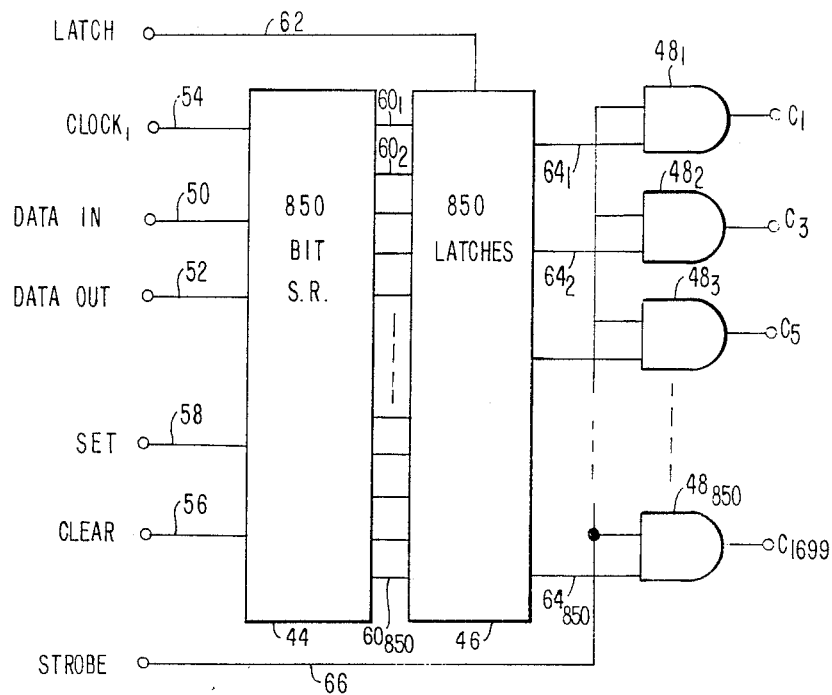
FIG. 5 is a block diagram serving to schematically illustrate a portion of an exemplary embodiment of column driver circuitry suitable for supplying data to the column conductors employed within the instant invention.
Figure 6:
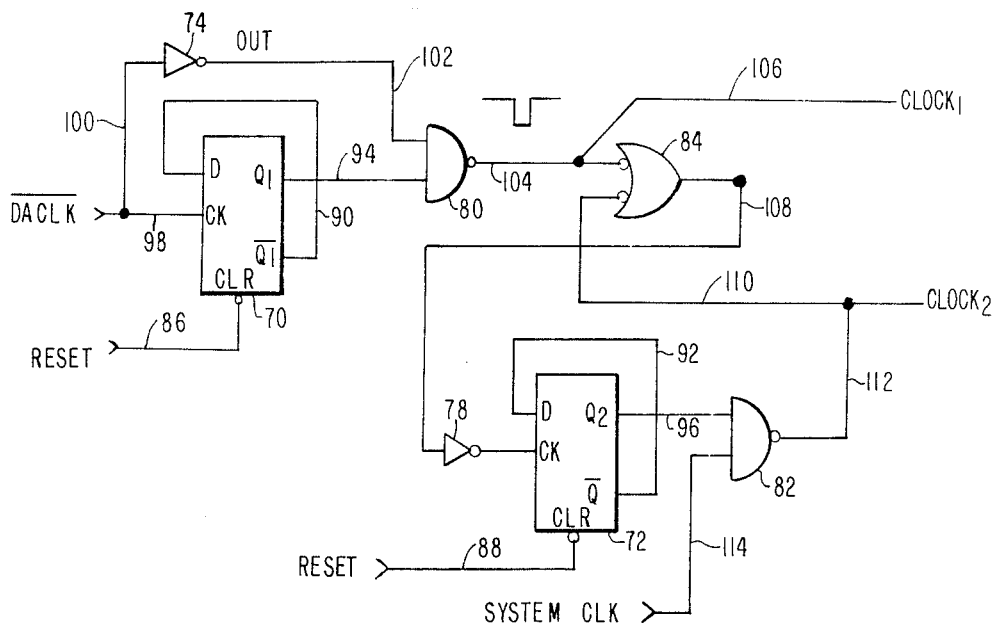
FIG. 6 is a block diagram serving to schematically illustrate an exemplary embodiment of a circuit suitable for separating data between odd and even column drivers.
Figure 8:
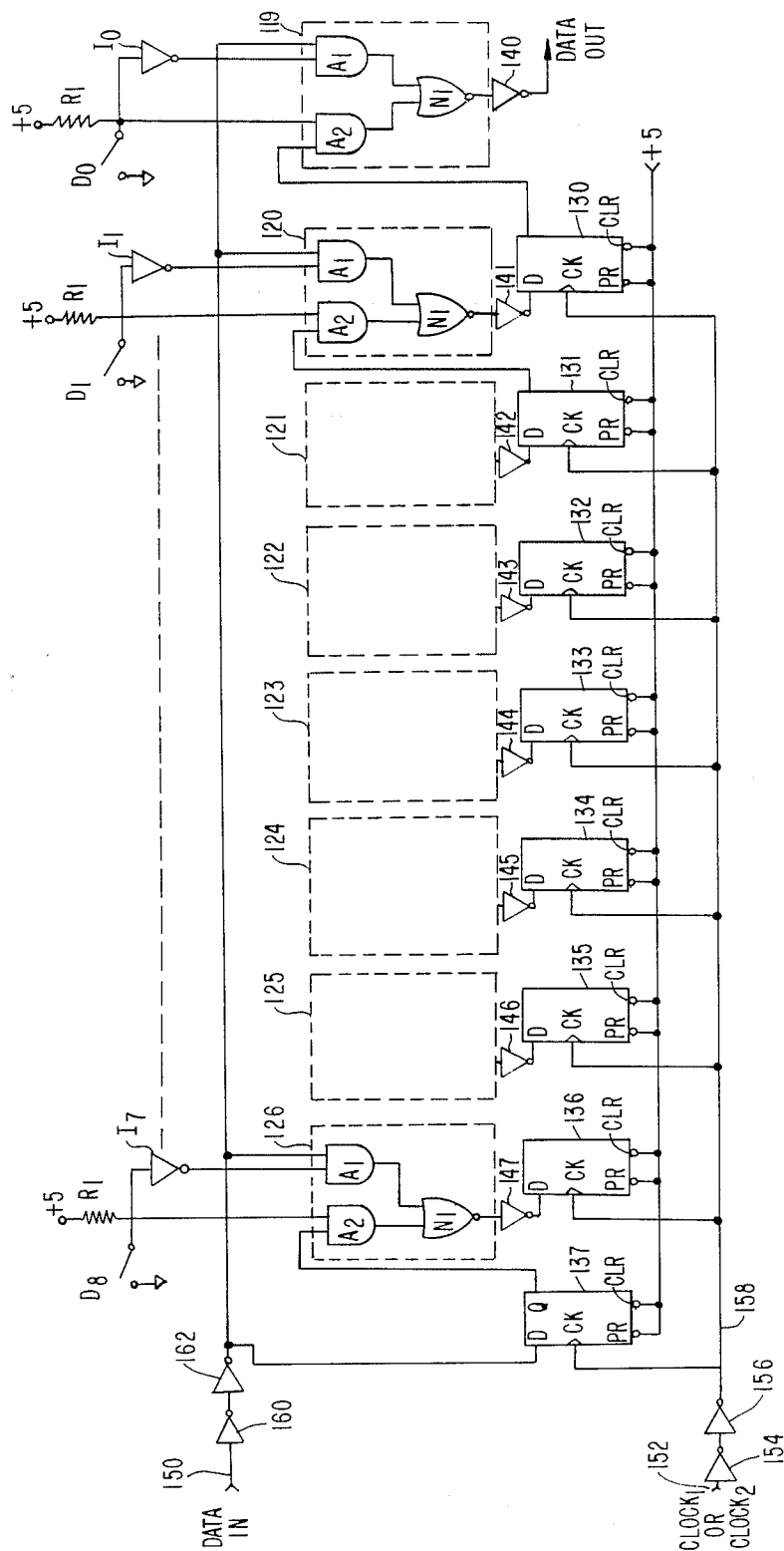
FIG. 8 illustrates a block diagram of an exemplary alignment correction circuit in accordance with the teachings of the instant invention.

Referring now to FIG. 2 there is shown a pictorial view illustrating frame structure suitable for mounting the electrophoretic display panel apparatus shown in FIG. 1 and, more particularly, the arrangement of contact pads therein. In FIG. 2 only the contact pads per se have been illustrated so that a reader hereof will be fully aprised of alignment problems which typically occur in mounting display panels of the type illustrated in FIG. 1. Interface and logic components such as shown in FIGS. 5, 6 and 8 herein which are normally included within such a frame structure as illustrated in FIG. 2 have not been shown therein to simplify the illustration set forth. Those of ordinary skill in the art, however, will appreciate that the same when normally incorporated are on conventional logic boards and may be mounted in a convenient manner within the frame of a separate structure. Furthermore, while a description of FIG. 2 will proceed on the basis that the display shown in FIG. 1 is merely mounted into the frame in FIG. 2 in such a manner to interconnect the contact pads in each device it will be appreciated that in actuality, convenient interconnecting elements therefor such as Zebra strips are normally provided. A detailed description of the additional details normally employed within a frame mounting structure suitable for mounting an electrophoretic display of the type illustrated in FIG. 1 may be found in U.S. patent application Ser. No. 728,602 which was filed on Apr. 29, 1985 in the names of Frank J. DiSanto et al. and is assigned to the assignee of the instant application.

A description of the location of circuit boards for mounting within such a frame may be found in this application together with a description of how Zebra strips may be employed to interconnect the contact pads 6 and 12 on the display with those provided within the frame illustrated in FIG. 2. Here, it is sufficient to appreciate that Zebra strips essentially are composed of thin slices of conducting and non-conducting material alternately positioned. When such a Zebra strip is placed between pairs of contact pads and the display panel is mounted within the frame, it will interconnect contact pads which are oppositely disposed while avoiding a possible short circuit condition between adjacent pairs of contact pads.

The frame structure illustrated in FIG. 2 comprises a frame structure 30 which may be formed of metal, plastic or the like and have the look of a conventional picture frame such as the modern aluminum picture frames employed for photographs or the like. The frame will have an internal cut-out 32 corresponding to a dimension of $8\frac{1}{2} \times 11$ inches or that corresponding to the anode 14. Mounted about the rectangular periphery internal to the frame are a pair of rows 34 and 36 of contact pads for the column conductors 12 for the display panel illustrated in FIG. 1 and a pair of columns 38 and 40 of contact pads for the row of contact pads 6 for the display illustrated in FIG. 1. Although FIG. 2 has not been drawn to scale and only relatively few contact pads have been shown, it will be appreciated from the description of FIG. 1 set forth above that rows 34 and 36 shall each contain 850 contact pads; row 34 containing contact pads for the odd column conductors brought out at the top of the display while row 36 contains 850 contact pads assigned, as indicated to the even contact columns brought out at the bottom of the display. Conversely, each column of contact pads 38 and 40 will have 1,100 contact pads wherein 1,100 contact pads in column 38 are assigned for connection to the 1,100 odd contact pads 6 brought out to the right of the display panel illustrated in FIG. 1 while the column of contact pads 40 will have 1,100 contact pads assigned respectively to the evenly numbered contact pads 6 brought out to the left of the display illustrated in FIG. 1. The odd and even assignment of the contact pads in rows 34 and 36 has been indicated in FIG. 2 as has the odd and the even assigned contact pads within columns 38 and 40.

Although no interface or control logic or boards therefor have been illustrated within the frame depicted in FIG. 2, those of ordinary skill in the art will appreciate that the same may readily be provided in the manner described in co-pending patent application Ser. No. 728,602 or in any other convenient manner. From the spacial relationship illustrated, it will also be seen that the embodiment of the display panel apparatus illustrate in FIG. 1 is configured to be inserted into the frame 30 with a glass plate 14 in which the anode resides disposed within the cut-out 32 of the frame. In this manner, the column of contact pads 6 for the odd row conductors will align with the column of connector pads 38 while the column of conductor pads 6 brought out to the left of the panel will align with the column 40 of conductor pads disposed on the right side of the frame. Similar alignment will occur for the row of conductor pads 12 across the top and bottom of the display panel with respect to the rows of contact pads 34 and 36. Therefore, it will be seen that if Zebra strips are disposed along each of the rows 34 and 36 and each of the columns 38 and 40 appropriate connection to corresponding rows and columns of connector pads 6 and 12 on the display will occur as long as the alignment is appropriate.

While not shown in FIG. 2 but as described in connection with FIGS. 5-8, column information in the form of 1's and 0's are loaded into a 1,700 bit latch arrangement formed by a pair of 850 bit, odd and even latches whereupon all 1,700 bits are simultaneosuly applied to corresponding ones of the 1,700 contact pads within the rows 34 and 36 of the frame. The same time loading takes place the single contact pad in columns 38 and 40 associated with the complete row of information being written is energized. If this information is appropriately applied to corresponding contact pads 6 and 12 on the display illustrated in FIG. 1 an appropriate row of information will be written on to the display. This will be continued until all 2,200 rows of the display have been written. Since the migration of electrophoretic particles will remain until the display is erased there is no need for a refreshing of the display until new information is to be written.

For the mounting conditions illustrated in FIGS. 1 and 2 it will be appreciated that 1,100 pairs of contact pads on each side of the frame 30 and the display panel illustrated in FIG. 1 must be properly connected when the display is mounted within the frame and similarly 850 pairs of contact pads across the top and bottom of the display and frame 30 must be properly connected during mounting. Further, it will be appreciated with so many pairs of contact pads to be properly aligned, misalignment during assembly will frequently occur under optimum conditions and this result is often substantially worsened when the mounting of a new display or frame is attempted in the field where conditions are less than optimal. When misalignment occurs as described in greater detail in connection with FIG. 7B, it will be seen that row information assigned to a particular row, or column information assigned to a particular column is supplied to the wrong row or column and results in distorted image information on the display. Furthermore, this condition may be worsened by the fact that a misaligned condition between the frame and display may be a result of a slight rotation of the frame with respect to the display so that misconnection of both row and column information can occur with the attendant rotation of the resulting image.

In actual practice it has been found that a skilled technician in mounting the display to the frame can easily achieve appropriate mounting within 4 contact pads in a row or column; however, this is wholly inadequate unless corrective procedures as further discussed below are implemented. The manner in which column information is supplied to the rows of column contact pads 34 and 36 is discussed in connection with FIGS. 5 and 6 while the manner in which misalignment occurs and is corrected is considered in conjunction with FIGS. 7A-7C and 8. Appropriate strobing of individual contact pads for the rows as present within columns 38 and 40 on the frame illustrated in FIG. 2 is performed in a manner similar to the manner in which column information is written. However, since only one row need be enabled by the application for 0 volt level thereto, the same is highly simplified with respect to the application of 1,700 bits of column information to the column conductors 10.

Referring now to FIG. 5 there is shown a block diagram schematically illustrating a portion of an exemplary embodiment of column driver circuitry suitable for supplying data to the column conductors 10 employed within the instant invention by way of applying 850 bits of column information to each of the contact pads in rows 34 and 36 of the contact pads on the frame 30. Since the circuitry illustrated in FIG. 5 is configured in a repetitive manner only circuitry for the odd contact pads in row 34 is illustrated it being appreciated by those of ordinary skill in the art, with the minor exception noted in the description thereof, identical circuitry would be employed for the even contact pads present in row 36 in FIG. 2.

The column driver circuitry illustrated in FIG. 5 comprises an 850 bit serial in, parallel out shift register 44, 850 latches 46 and 850 AND gates $48_1$–$48_{850}$. The 850 bit serial in, parallel out shift register 44 may be formed by interconnecting a plurality of 64 bit, 32 bit, serial in, parallel out shift registers or a combination thereof until an 850 bit shift register configuration is obtained. Thus, 13, 64 bit and 1 32 bit shift register chips could be interconnected in such a manner that the Data Output of a preceding shift register is interconnected to the Data Input of the next shift register in sequence while the Clock and Clear inputs are connected in parallel. The set inputs thereto if employed may also be connected in parallel, however, in the usual case it is only the set input of the first shift register chip which is utilized to set a 1 into the initial stage thereof after the same has been cleared and hence parallel connection of this input is not usually required. In the case of FIG. 5, the Data In input is connected to conductor 50 in the manner indicated and would receive 1,700 bits of serial information representing dot information as would be typically generated by the character generator ROM employed within a word processing station or other processor to which the display being driven is connected. Those of ordinary skill in the art will appreciate that in generating a line of character information for any display the line is typically assembled by the processor and supplied a character at a time to a character generator ROM which will output appropriate dot information therefor. Thus, if a typical 5×7 character generator ROM is considered for purposes of simplicity as each ASCII character within a line of information to be displayed is supplied thereto, the character generator ROM will produce 5 bits of dot or no dot information for each character in the line of information provided and this information plus appropriate spacing information will typically be assembled in a shift register and output serially to the display which in this case would be the Data In input connected to conductor 50. For each line of character information provided to the character generator ROM, 7 lines of dot or no dot information will be output for each character and line information corresponding to the entire line of ASCII code supplied to the character generator ROM will be supplied to the display one line at a time.

In the arrangement illustrated in FIG. 5 1,700 bits of dot or no dot information are supplied to the terminal connected to conductor 50 and hence the 850 bit shift register 44. Those of ordinary skill in the art will appreciate that only half of the 1,700 bits of information provided to the Data In input connected to conductor 50 are written in the 850 bit shift register 44. This is done as seen in greater detail in connection with FIG. 6 by arranging for the clock applied to the shift register 44 and annotated Clock 1 to cause every other bit supplied to the Data In input on conductor 50 to be written within the shift register 44. This effectively causes the odd bits of data supplied to the Data In input on conductor 50 to be applied to the connector pads in column 34 on the frame illustrated in FIG. 2. An identical circuit to that illustrated in FIG. 5 is provided for the evenly designated connector pads within the row of connector pads 36 as shown in FIG. 2. However, the clock applied to that shift register is synchronized in a manner described in connection with FIG. 6 such that only the even bits present within the 1,700 bit data string are written into the corresponding arrangement established for the connector pads within row 36 which have been assigned even bits of column data.

The terminal annotated Data Out which is connected through conductor 52 to the shift register 44 takes the form of a conventional overflow or Data Out output of a shift register. In assembling an 850 bit serial in, parallel out shift register such as shift register 44 the data output of each register chip except for the last would be connected to the Data In input of the following shift register chip so that a series chain for the data being clocked through the devices is established in a manner well-known to those of ordinary skill in the art. If prior to writing data into the shift register 44 a 1 is written into the first bit position of the first shift register chip the Data Out output of the last stage thereof may be monitored and when an 1 output is shifted therefrom the same may be employed to indicate that the 850 bit shift register 44 has been fully loaded. Hence the presence of the 1 output may be employed to generate an enable level or other strobe signal.

The Clock 1 input connected to conductor 54 is developed from the circuit illustrated in FIG. 6. As shall be seen in greater detail below 850 clock pulses are generated thereby in response to a system data clock which effectively generates 1,700 clock pulses. The Clock 1 pulses are timed to occur during the presence of the 850 odd bits of data present in the 1,700 bit data stream supplied to the Data In input 50. In this way, alternate bits of data present in the data stream applied to conductor 50 which correspond to the 850 odd data bits therein are serially clocked into the shift register 44 so that upon the expiration of 850 clock pulses the shift register 44 will be loaded with the 850 odd bits of data within the data stream. Conversely, in identical structure employed for the column conductors present in row 36 in FIG. 2, a Clock 2 input as shall be seen below generates 850 synchronously timed clock pulses which correspond to the presence of the 850 even bits of data present in the 1,700 bit data stream supplied to the Data In input of the 850 bit shift register employed for the evenly designated connector pads in row 36. Using this approach, it will be appreciated that the data need not be separated for application to the odd and even column connector pads in rows 34 and 36 in FIG. 2 and similarly separate connection from a 1,700 bit driven arrangement is not necessary.

The Clear input to the shift register 44 which is connected to conductor 56 is employed to clear the shift register 44 each time 850 bits of odd column information have been written into the shift register 44 and subsequently loaded in parallel into the 850 latches 46. Thereafter, while the latches 46 are being read, new column information may be clocked into the 850 bit shift register 44 so that information may be written into the shift register 44 and read from the latches 46 in a flip flopped or alternating manner well-known to those of ordinary skill in the art. The Set input to the 850 bit shift register 44 connected on conductor 58 is not generally employed except, for the purpose of writing an initializing 1 into stage one of the first shift register in the 850 bit shift register 44 or for diagnostic purposes which are not here relevant.

The output of the 850 bit shift register 44 is applied in parallel through conductors $60_1$–$60_{850}$ to the individual latches within the 850 latch array 46. The operation of the shift register 44, as will be readily appreciated by those of ordinary skill in the art, is that the same is cleared subsequent to the gating of information therefrom into the 850 latch array 46. This is done by the application of a clear pulse to a conductor 56. Once clearing has occurred a 1 may be written into the initial stage thereof by the application of 1 level to the set input thereof and thereafter data and clock signals on conductors 50 and 54 are awaited. More particularly, serial data is applied to conductor 50 in the manner aforesaid so that a serial stream of 1,700 bits is applied thereto. As the data is applied Clock 1 pulses are applied to conductor 54 in such a manner that 850 clock pulses timed to occur during the presence of the odd data pulses within the data stream are applied to conductor 54. This will cause, in a manner well-known to those of ordinary skill in the art the odd data pulses present in the serial data stream applied to conductors 60 to be clocked through the 850 bit storage locations within the shift register 44 in a serial manner.

Once 850 clock pulses have been supplied to the conductor 54, the clock pulses are terminated in a manner which will be described in greater detail in connection with FIG. 6. Since 850 bits of data corresponding to the 850 odd bits of data within the data stream are now loaded into the shift register 44 the same are now present at the outputs thereof on conductors $60_1$–$60_{850}$. Once this occurs a latch pulse is applied in parallel to each of the 850 latches within the latch array 6. Upon the occurence of the latch pulse which is applied to conductor 62 in the manner indicated in FIG. 5, the 850 bits of data present on conductor $60_1$–$60_{850}$ are latched into the latch array 46. Thereafter, the shift register 44 may be cleared to await a next group of 850 bits of information associated with the next 1,700 bits of data for the row within the display. It will also be appreciated that what has just been described for the odd column driver array shown in FIG. 5 will also be occurring with respect to the even column driver array, not shown, under the auspices of the Clock 2 clocking signal.

The latch array 46 may comprise 850 individual latches or alternatively a plurality of multi-latch chips may be employed. In either case the latch input to each chip is connected in parallel to conductor 62. Each of the latches act in the manner well-known to those of ordinary skill in the art to load any data supplied to the inputs thereto on conductors $60_1$–$60_{850}$ during the presence of a latching pulse on conductor 62. Once a bit is latched into an individual latch within the array 46, it is present on the outputs of the individual latches here indicated as connected to conductor $64_1$–$64_{850}$ until new data is latched into the latches by the application a new enable level on conductor 62. This structure would also be present in the drive circuit for the even columns.

Once the data from the shift register has been latched into the latch array 46 it is available on conductors $64_1$–$64_{850}$ and as indicated in FIG. 5 is applied to one input of the plurality of AND gates $48_1$–$48_{850}$ it being appreciated that one AND gate is assigned to each latch within the latch array 46. At this time, as aforesaid, a new write operation may be initiated for the 850 bit shift register 44 as well as that in the even column array. A second input to each of the AND gates $48_1$–$48_{850}$ is connected to the conductor 66. The conductor 66 is connected to an output annotated Strobe which is a system generated pulse which occurs subsequent to the latching level applied to conductor 62. The strobe level it will be appreciated is employed to strobe the contents of each latch stage within the latch arrry 46 through the AND gates $48_1$–$48_{850}$ to the outputs thereof herein annotated $C_1$, $C_3$, $C_5$ and $C_{1699}$.

Thus, each of AND gates $48_1$–$48_{850}$ acts in a manner well-known to those of ordinary skill in the art to produce a high at the outputs thereof only when both of the inputs thereto are high and only for the duration of such high inputs. Therefore, it will be appreciated that when a high level is applied to the strobe conductor 66 whatever input is supplied to the AND gates $48_1$–$48_{850}$ on conductors $64_1$–$64_{850}$ is applied to the outputs of the AND gates for the duration of the strobe pulse. The outputs of each of the AND gates $48_1$–$48_{850}$ as indicated by the terminal annotations $C_1$–$C_{1699}$ are connected to the odd column connector pads disposed within the row of connector pads 34 illustrated in FIG. 2.

Conversely, a corresponding circuit to that shown in FIG. 5 employing a $Clock_2$ input for the shift register 44 would be connected in a corresponding manner to the even column connector pads located in the row of connector pads 36 on the frame illustrated in FIG. 3. This circuit would have its corresponding AND gates strobed at the same time as AND gates $48_1$–$48_{850}$. Thus both the odd and even column lines will be written with appropriate 1's and 0's at the same time. As the entire circuit illustrated in FIG. 4 can be implemented in CMOS, it will be appreciated that the circuits and the connections therefrom may be mounted entirely within the structure of the frame illustrated in FIG. 3, in precisely the manner described in U.S. patent application Ser. No. 728,602 as aforesaid. Thus, in the manner described in FIG. 5, 850 bits of column information assigned to a particular row on the display will be clocked into the shift register 44, latched within the latch array 46 and thereafter strobed to the column connector pads in the row of column connector pads 34 shown in FIG. 2. This also occurs at the same time for the even column connector pads in row 36. Once this is done, the predetermined row on the display to which this data is assigned is strobed by having a zero level applied thereto so that data on each of the column conductors is written into the display by virtue of the electrophoretic particle propagation which occurs as a result of the selective energizing of each intersection within that row. This procedure is continued until all 1,700 column positions for each of the 2,200 rows had been written. Once this is achieved no further writing takes place until what is displayed is to be changed since, as aforesaid, the display exhibits hysteresis.

While a technique for supplying a 0 volt level to each of the odd and even row connector pads present in column 38 and 40 in FIG. 2 has not been described herein, those of ordinary skill in the art will readily appreciate that the same may readily be achieved through a simple modification of a driver circuitry illustrated in FIG. 5 or, alternatively, other simplified driving arrangements could be employed. Thus, identical structure to that employed for the odd and even columns, as shown in FIG. 5, could be employed for each of the odd and even connector pads in columns 38 and 40 except that 1,100 bit shift registers and latch arrangements would be configured. Here each of the 1,100 bit shift registers would be initialized so that a 1 is present in each stage thereof and a 0 is then written into the first stage of each 1,100 bit register. Each 1,100 bit shift register may be clocked in an alternate manner each time the column driver arrangement for the odd and even columns as shown in FIG. 5 is enabled or strobed and the 1,100 bit latches thereof are strobed in an alternate manner when the 1,700 bit column latches are strobed. A row is written when a 0 volt level is applied to a row conductor 4 and 1 and 0 information is present on all 1,700 column lines 10.

Referring now to FIG. 6 there is shown a block diagram schematically illustrating an exemplary embodiment of a circuit suitable for separating data between odd and even columns. The circuit illustrated in FIG. 6 serves to generate the Clock$_1$ input described in connection with FIG. 5 as well as a Clock$_2$ input which would be employed in a circuit identical to that illustration in FIG. 5 to drive even columns C2, C4, C6 ... C1700. The use of separate odd and even driver circuits such as illustated in FIG. 5 is preferred in order to permit installation of such driver circuits in association with the odd and even column connection pads illustrated in FIG. 2. Those of ordinary skill in the art will appreciate that the circuit of FIG. 5 may be replaced by a 1700 bit arrangement and under these circumstances direct connection to odd and even connection pads could be implemented. This of course would avoid the need for the use of the exemplary embodiment of a circuit for separating data between odd and even columns as illustrated in FIG. 6.

The function of the exemplary circuit illustrated in FIG. 6 is to separate a stream of data clock pulses into two streams of clock pulses herein designated Clock$_1$ and Clock$_2$ which represent the odd and even clock pulses respectively within the stream of data clock pulses. Data clock pulses as shall be seen in greater detail below are pulses which are synchronized to the system clock and correspond in width thereto. However, the same represent a burst of pulses which are synchronized to the beginning of data to be written and have a fixed length corresponding to the number of bits to be written. Thus under the circumstances here being described data clock pulses will correspond in number to 1700, the number of column bits written in each row.

The exemplary embodiment of a circuit suitable for separating data between odd and even columns illustrated in FIG. 6 comprises first and second flip flops 70 and 72, a plurality of inverters 74 and 78, NAND gates 80 and 82 and an OR gate 84 whose inputs are inverted. The flip flops 70 and 72 may take the form of conventional D type flip flops which act in the conventional manner to present the logic condition applied at the D input thereto to its Q output whenever a clock pulse is applied during the presence of such D input. The complementary condition is maintained at the Q Not output. The clear input to each of the flip flops 70 and 72 is connected as indicated through conductors 86 and 88 to a system reset. The D input of each of the flip flops 70 and 72 is connected through conductors 90 and 92 to the Q Not or complementary output present at the flip flop. In similar manner, the Q output of each of the flip flops 70 and 72 is connected through conductors 94 and 96, respectively, to one input of a NAND gate 80 or 82 associated therewith. Thus, the exemplary clock pulse separation circuit illustrated in FIG. 6 is highly symmetrical.

The clock input to the flip flop 70 is connected through a conductor 98 to an input annotated DACLK bar or the Data Clock Not input which represents the inverted data clock. The data clock, as was briefly noted above corresponds to the system clock in frequency, pulsewidth and polarity; however, the number of pulses present therein is limited to the number of bits to be written into the column drivers or in the case being discussed 1700. The data clock may be conveniently developed by ANDing the system clock with the output of a counter. This data clock is then inverted through the use of a conventional inverter in order that negatively directed clock pulses appropriate for switching the D flip flops 70 and 72 are obtained. The data clock input on conductor 98 is also supplied through conductor 100 to the inverters 74. The inverter 74 may take the conventional form of an inverter device which acts to produce a complement of an input at the output thereof and is here employed to ensure appropriate timing. The inverter 74 produces a complementary clocking lever at its output. The output of inverter 74 is applied through the conductor 102 to a second input of the NAND gate 80.

The NAND gate 80 acts in the conventional manner to produce a low at the output thereof on conductor 104 when both of the inputs thereto are high. Thus, when the Data Clock Not input on conductor 98 is high and the output of the flip flop 70 on conductor 94 is high, the output of NAND gate 80 will go low on conductor 104; however, when either input to NAND gate 80 is low the output on conductor 104 will be high. The output of the NAND gate 80 on conductor 104 is directly applied through conductor 106 to the terminal annotated clock$_1$ which is a signal directly employed in FIG. 5 as a aforesaid. Thus, a negative pulse will be produced on conductor 106 to correspond with the presence of the first, third, fifth ... 1699th clock pulses within the data clock.

The output of NAND gate 80 as present on conductor 104 is also applied as indicated in FIG. 6 to one input of the OR gate 84 whose inputs are inverted. The OR gate 84 acts in the conventional manner of this well known class of device to produce a high at the output thereof on conductor 108 only when one of the inputs thereto is low. The output of OR gate 84 as supplied on conductor 108 is employed to generate the clock input for the second flip flop 72 after the same is inverted by the inverter 78 in the manner plainly illustrated in FIG. 6. It will be appreciated that each time the clock$_1$ output on conductor 106 goes high or terminates the output of OR gate 84 will go low and after inversion by the inverter 78 will effectively. This means that the Q Not output of flip flop 72 as supplied to the D input thereof on conductor 92 is clocked into the Q2 output thereof on conductor 96 when the Clock$_1$ output goes high or terminates.

A second input to the OR gate 84 is supplied through conductor 110 from the output of the NAND gate 82 on conductor 112. This output of the NAND gate 82 it will be noted corresponds to the Clock$_2$ output of the circuit or the clock output which comprises even pulses 2, 4, 6 ... 1700 as present within the data clock. The NAND gate 82 whose output on conductor 112 is employed to generate the Clock$_2$ signal acts in the well known manner to produce a low at the output thereof on conductor 112 whenever both inputs thereto are high.

The first input to NAND gate 82 is supplied, as aforesaid, through conductor 96 from the Q output of flip flop 72. The second input to NAND gate 82 is connected through conductor 114 from the system clock as indicated in FIG. 6. Thus those of ordinary skill in the art will appreciate that while the Q2 output of flip flop 72 will go high at the termination of the Clock 1 input, this input on conductor 96 to NAND gate 82 is gated by the system clock applied on conductor 114. Hence, while conductor 96 is primed at the termination of the Clock 1 input, the output of NAND gate 82 will not go low until the next clock signal is produced by the system clock, which is synchronized with the data clock, on conductor 114. Thus, it is during this interval of the system clock which is an even pulse that the output on conductor 112 which generates $Clock_2$ will go low.

In describing the operation of the exemplary circuit for separating data between odd and even columns as shown in FIG. 6, it will be assumed that both flip flops 70 and 72 have been reset by reset levels on conductors 86 and 88. Under these conditions, the Q Not output of each flip flop will be high while the Q output thereof is low. When the first inverted data clock pulse is applied to conductor 98 flip flop 70 will clock the Q Not output which is high into the D input thereof and produce a high level on conductor 94. At the same time and for the duration of this first clock pulse the output of inverter 74 will be high producing the second high on conductor 102 and causing the output of NAND gate 80 to go low on conductor 104 for the duration of the fist clock pulse. However, as soon as the first clock pulse terminates the output of inverter 74 will go low causing the output of NAND gate 80 to go high.

Thus, in this manenr the first clock pulse corresponding in duration to the inverted data clock on conductor 98 is produced on conductor 106 as the Clock 1 signal. This same clock pulse on conductor 104 will cause the output of OR gate 84 to go high. This in turn will produce a low level or clocking input at the output of inverter 78 which is applied to the clock input of the second flip flop 72. This clock pulse will cause the Q Not output of flip flop 72 to be clocked into the D input thereof causing the Q2 output on conductor 96 to go high.

The high output on conductor 96, however, will not cause the output of gate 82 to go low until the occurrence of the second clock pulse which is received on conductor 114 from the system clock. Hence during the presence of the second clock pulse the output of NAND gate 82 will go low producing a negative going clock pulse on conductor 110 which corresponds to the $Clock_2$ signal. This $Clock_2$ pulse will stay low only for the duration of the second clock pulse received on conductor 114 from the system clock. Thus the $Clock_2$ output will go low and stay low for the duration of the second pulse in the system clock signal. This second clock pulse is also supplied through conductor 110 to OR gate 84 which acts to reset flip flop 72. Flip flop 70 is reset in a corresponding manner. Thus, it is seen that the circuit illustrated in FIG. 6 will supply odd numbered clock pulses within the data clock at it's $Clock_1$ output while even numbered clock pulses present in the data clock are applied to the $Clock_2$ output thereof. Each clock signal present at the $Clock_1$ and $Clock_2$ outputs thereof are negative going clock pulses which correspond in duration to the clock pulses present in the data clock and system clock.

Figure 7A:
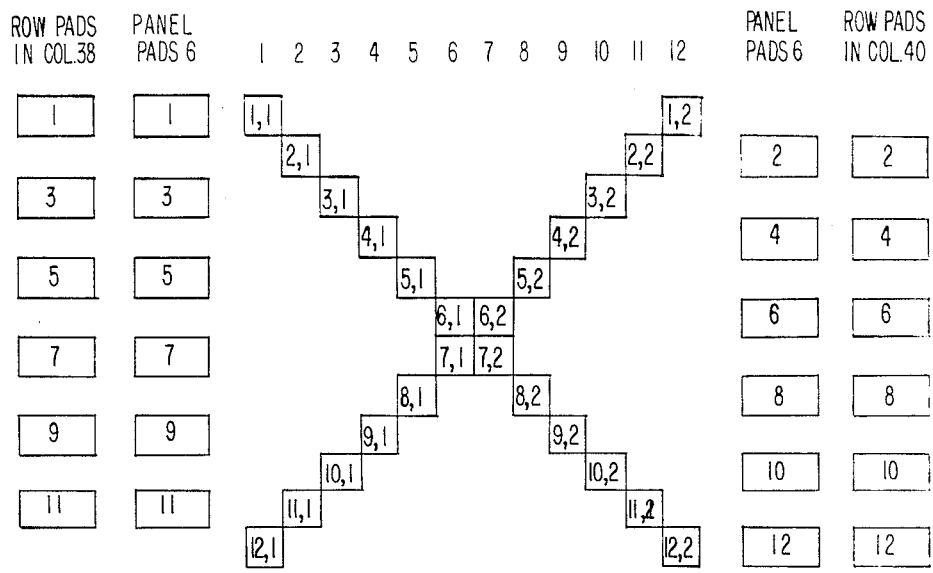
FIGS. 7A-7C are illustrative diagrams showing a portion of exemplary electrophoretic display panel apparatus under conditions of proper alignment of contact pads in the electrophoretic display panel apparatus shown in FIG. 1 with the contact pads on the frame as shown in shown in FIG. 7B, and corrected alignment according to the teachings of the present invention as shown in FIG. 7C.
Figure 7B:
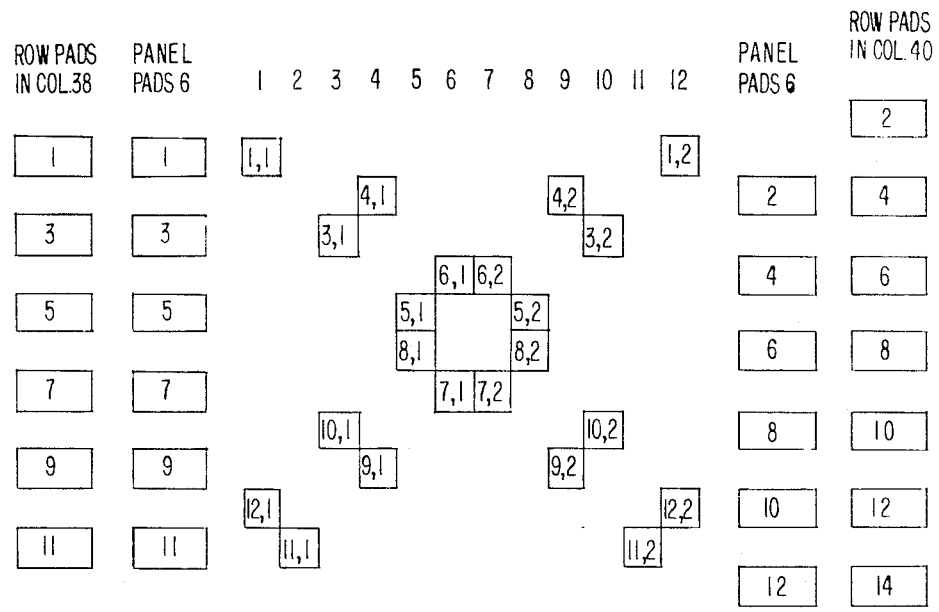
Figure 7C:
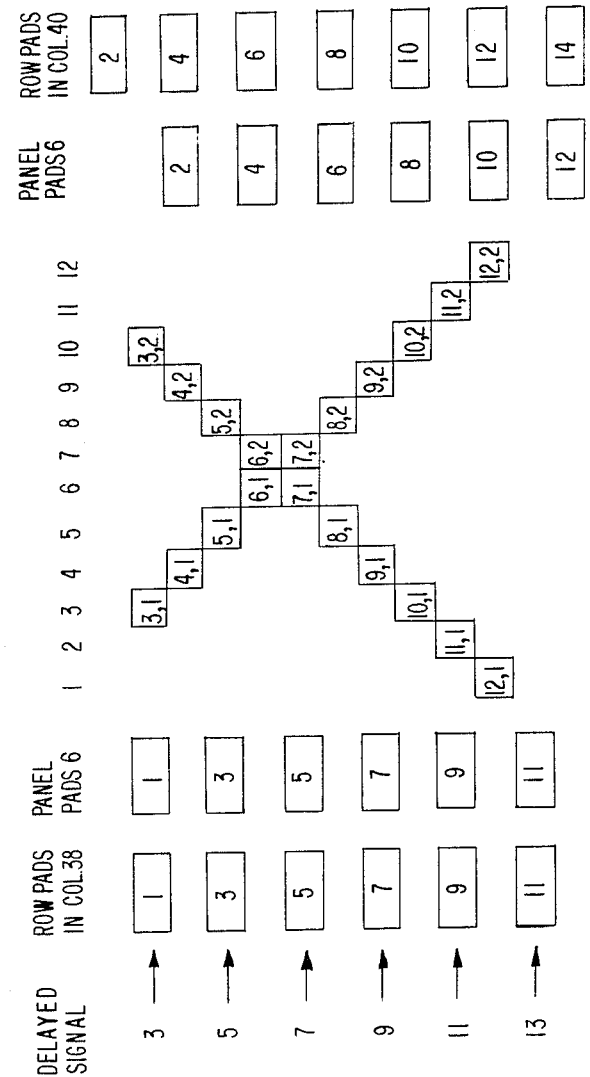

Referring now to FIGS. 7A–7C exemplary diagrams are set forth to illustrate the result of misalignment of connections between the contact pads of the frame illustrated in FIG. 2 as illustrated by contact pads present in rows 34 and 36 as well as columns 38 and 40 and the contact pads 6 and 12 on the display. In this regard it should be noted that only highly simplified illustrations are set forth. Misalignments which generally occur would tend to be somewhat more complex.

FIG. 7A shows an illustrative diagram of a portion of a display under conditions of proper alignment of the contact pads on the electrophoretic display panel apparatus shown in FIG. 1 with the contact pads on the frame shown in FIG. 2. More particularly, as shown in FIG. 7A, it is assumed that an X is being displayed on a portion of the display panel illustrated in FIG. 1 controlled by data supplied to column conductors 1–12 and row conductors 1–12. It will be appreciated that the X will be properly displayed when the rows and columns are connected in the manner illustrated in FIG. 7A. It should be noted that proper column connection is assumed in all the illustrative examples set forth in FIGS. 7A–7C, hoowever corresponding misconnection thereof to that being discussed herein will result in corresponding misalignment problems where rows are improperly connected and under conditions where both columns and rows are misaligned, image rotation will additionally occur.

At any rate when each of the pads present in columns 38 and 40 are properly connected to their corresponding contact pads in the manner illustrated in FIG. 7A, a properly configured X will be displayed on the panel in the manner illustrated in FIG. 7A. Note in FIG. 7A the proper alignment of the contact pads is shown by the opposite positioning of correspondingly numbered pads so that pad 1 is shown opposite pad 1, pad 2 is shown opposite pad 2, and at the bottom of each column pad 11 is shown opposite pad 11, while pad 12 is shown opposite pad 12. Under these conditions an X is properly designated and displayed it being noted that the coordinates for the driver lines associated with each element in the display for the X are shown in the elements of the X depicted in FIG. 7A.

FIG. 7B treats a case of simple misalignment in that while all of the row pads in the odd columns disposed along the left-hand portion of the figure are properly aligned, a simple misalignment of one row has occurred along the right hand set of pads so that as illustrated in FIG. 7B frame pad for row 4 is connected to display pad for row 2 and such misalignment by one row is continued. Under these conditions it will be seen that the X which should have been displayed in highly distorted for the simple misalignment condition being considered. In this regard it should be appreciated that in the actual assembling of such displays technicians may readily get correct alignment within an order of 4, however, perfect alignment is much more difficult to obtain and it is not at all infrequent that much time is spent in repositioning the frame structure. Obviously, misalignment by an order of 4 in FIG. 7B would result in a much greater case of distortion and of course might well result in misalignment of the columns as well. This of course would produce a rotation of the distorted image.

It has been found according to one aspect of the instant invention that misalignment after the assembly of the display within the frame may be simply corrected through electronic means. This is accomplished by effecting a delay in the information applied to the non-misaligned pads which delay corresponds to the number of clock pulses associated with the degree of misalignment. Accordingly when correction in this manner is implemented, as shown in FIG. 7C, although some loss of information occurs the distorted information being displayed is corrected. Thus, it will be recalled in FIG. 7B misalignment of one column had occurred resulting in the distorted image of an X shown in FIG. 7B. If however the information provided to the rows which are not misaligned, i.e. those illustrated at the left-hand portion of FIG. 7C, is delayed by the number of clock pulses corresponding to the misalignment, the image depicted is corrected even though some information is lost. Thus, in FIG. 7C it will be seen that the row pads associated with the right-hand side of the figure are misaligned by one row. Therefore, referring to the left-hand side of the illustration the information provided to the properly aligned row pads is delayed by one clock cycle so that information for row 3 is provided to row 1. Thus a delay corresponding to one clock cycle is provided to all tow information for the odd rows illustrated along the left-hand portion of FIG. 7C. The X now displayed in FIG. 7C is correct and looks likes an X except that the two top lines of information have been lost. This distortion is extremely slight compared to what is produced in FIG. 7B.

Referring now to FIG. 8, there is shown an illustrative block diagram of an exemplary alignment correction circuit in accordance with the teachings of the instant invention and more particularly an exemplary circuit for implementing the correction illustrated in FIG. 7C or the like. The circuit illustrated in FIG. 8 is connected for example in series with the data input supplied to the circuit shown in FIG. 5 for the odd column connectors and receives its input from the data stream normally applied to the Data In input on conductor 50 as illustrated in FIG. 5. It is envisioned that one circuit of the type illustrated in FIG. 8 shall be applied to each of the odd and even column driver circuits employed with the electrophoretic display panel apparatus according to the instant invention and conversely a circuit of the type illustrated in FIG. 8 shall also be applied to each of the odd and even row driver circuits employed. In the case of the row driver circuits, only the clock rate defines the row to be energized but the same may be treated in similar manner to data. The exemplary embodiment of the circuit illustrated in FIG. 4 is capable of correcting misalignment problems of the type described in association with FIG. 7A-7C for up to eight levels of misalignment of the pads associated with an odd or even row or column. The circuit of FIG. 8 is basically a delay device and hence if the odd rows were misaligned correction would be implemented on the even rows and vise versa and the same situation obtains for the columns.

The illustrative block diagram of the alignment correction circuit illustrated in FIG. 8 comprises eight switches indicated generally by switches $D_0$-$D_7$, eight gating circuits 119-126 and eight flip flops 130-137. In breif, the circuit is operative to insert one clock cycle of delay into a signal for each switch $D_0$-$D_7$ that is opened while if the switch is left in a closed position no delay is inserted. The switches must be opened in numerical order and the circuit receives data on the right and outputs data at the left.

The exemplary circuit illustrated in FIG. 8 is symmetrical and constructed in stages, each stage corresponding to one element of delay. More particularly, each of the switches $D_0$-$D_7$ is a single throw switch which connects between ground as shown in its closed position and a junction connected to 5 volts DC through a resistor R1, an input to an associated inverter $I_0$-$I_7$ and one input to an associated one of gate chips 119-126.

Each of the gate chips 119-126 may comprise a conventional 7451 chip as available from Texas Instrument Corporation or the like. Each of gate chips 119-126 has been illustrated as comprising a pair of AND gate $A_1$ and $A_2$ and NOR gate $N_1$. Each of the AND gates $A_1$ and $A_2$ act in the conventional manner of this well-known class of device to produce a high output only when both of the inputs thereto are high while producing a low when any input thereto is low. The NOR gates $N_1$ comprise conventional forms of this well-known class of device and act to produce a low at the output thereof when either of the inputs thereto are high. The inputs to each of the NOR gates $N_1$ are provided from the outputs of the NAD gates $A_1$ and $A_2$ within each of gate chips 119-126. Furthermore, each of gate chips 119-126 are provided with inputs in a corresponding manner. The outputs of each gate chip 119-126 as taken from the output of the NOR gate $N_1$, is inverted through one of inverters 140-147 and provided to either the data output of this circuit in the case of inverter 140 or to the flip flop 130-136 associated with the output of that stage.

Each of the flip flops 130-137 are conventional D-type flip flops which act in the manner described in connection with FIG. 6 to assume the level applied to its D input in the presence of a clock pulse. The D inputs to each of flip flops 130-136 are connected to the inverter 141-147 associated with that stage while the D input to flip flop 137 receives the data input to the circuit as indicated by the terminal 150. The Clock input to each of the flip flops 130-137 is supplied with a Clock 1 or Clock 2 input provided to the odd or even row or column to which it is assigned. This clock input is developed in the precise manner as was described in connection with FIG. 6. The clock input as indicated in FIG. 8 is inverted by a pair of conventional inverters 154 and 156 and thereafter applied to the clock input of each of the flip flops 131-136 through the conductor 158. The Data In input which, in the case of column drivers, would correspond to the Data In input on conductor 52 in FIG. 5 is applied through a pair of inverters 160 and 162 to the D input of the flip flop 137 and one of the inputs to the $A_1$ AND gate present in each of the gate circuits 119-126.

In operation it is contemplated that one circuit such as illustrated in FIG. 8 will be provided for each of the odd and even column driver circuits as well as each of the odd and even row driver circuits. After assembly of the display into the frame illustrated in FIG. 2 all the switches $D_0$-$D_7$ in each of the four delay arrays provided will be closed. Thereafter the display will be energized and the operator will note any misalignment problems on the screen. For instance, if a result such as illustrated in FIG. 7B occurred, it would be clear that misalignment has occurred with respect to one of the rows present in the even side of the panel. This would require that one switch $D_0$ be closed in the delay array illustrated in FIG. 8 assigned to the odd side of the panel so that the correction illustrated in FIG. 7C can be obtained. Under these circumstances switch $D_0$ would be opened while all the remaining switches remain closed.

From an inspection of FIG. 8 those of ordinary skill in the art will appreciate that when $D_0$ is closed, the inputs associated with AND gate $A_1$ in each of the gate arrays 119-126 is enabled while when the switch is opened to insert delay, AND gate $A_1$ is disabled while AND gate $A_2$ is enabled. This means that the bit of data being processed will be processed through the preceding gate array and its output, delayed by one clock pulse in the flip flop associated therewith and gated through the $A_2$ AND gate within the next gate array in the following clock cycle.

For instance, if it is assumed that perfect alignment has been achieved all the switches $D_0$-$D_7$ would be closed. Under these circumstances the output of inverter $I_0$ would be high predisposing AND gate $A_1$ in the gate array 119 to follow the condition of data applied to terminal 150 and subsequently through the inverters 160 and 162 to the other input of the AND gate $A_1$. If this data bit were high this would result in a high, at the output of AND gate A1 within the gate array 119. Since under these conditions switch $D_0$ is closed, one input to AND gate $A_2$ will be low so that this gate is effectively disabled. When the output of AND gate $A_1$ goes high, the output of NOR gate $N_1$ will go low. This low will be inverted by the inverter 140 and an appropriate, undelayed data bit, will be supplied to the driver circuit illustrated in FIG. 5.

However, if it is assumed that one element of delay is to be inserted, switches $D_1$-$D_7$ would remain closed while switch $D_0$ would be opened. Under these conditions a high level would be present at one input to AND gate $A_2$ while a low is imposed on the input of AND gate $A_1$ connected to the inverter $I_0$. Hence AND gate $A_1$ is effectively disabled. Under these conditions gate array 120 would be effectively enabled for the receipt of the first bit of data. Therefore, when this bit of data is applied to AND gate $A_1$ which is enabled by a high from the output of inverter $I_1$, the output of AND gate $A_1$ in gate array 120 would go high placing a high at the input to NOR gate $N_1$. Thus if the first data bit on input terminal 150 were high, the output of AND gate $A_1$ within gate array 120 would go high causing the output of NOR gate $N_1$ to go low. This would be inverted by the inverter 141 and would cause the Q-output of the flip flop 130 to go high when the next clock pulse was applied to conductor 158. Thus, the data bit would be loaded into the flip flop 130 with the next clock pulse and applied to the second input of AND gate $A_2$ within the gate array 119. Once this occurs, the output of $A_2$ due to the open condition of switch $D_0$ would go high causing a low to be gated out of NOR gate $N_1$ and a high to be supplied to the data output connected to the output of the inverter 140.

Those of ordinary skill in the art will appreciate that in precisely the foregoing manner one element of delay is inserted for each of the switches $D_0$-$D_7$ that is opened and hence correction of the type illustrated in FIG. 7C may be readily implemented with the arrangement set forth in FIG. 8. Once correction has been implemented by a technician, the switches $D_0$-$D_7$ are fixed and in certain embodiments it may be desired to burn the switches into their set positions so that they may not be altered. Alternatively, merely placing the switches at inexcessible locations may suffice and this is viewed as highly advantageous since the same will facilitate readjustment in a case where changing of the display in the field may be desired.

Those of ordinary skill in the art will appreciate that the instant invention admits of many adaptations and variations to suit choice of design. For instance, more or less delay stages of the type shown in FIG. 8 may be provided and the same may be implemented using different techniques. Further, in connection with the tined grid structure illustrated in FIGS. 3 and 4 it will be appreciated that a greater or fewer number of tines may be employed for purposes of maximizing contrast or providing specialized forms of contrast suited to a particular application. In this regard, it may additionally be noted that depending upon the types of colors employed in the electrophoretic display panel apparatus, contrast will vary and for this reason too either a greater or lesser number of tines may be desired.

Those of ordinary skill in the art will readily appreciate the instant invention provides techniques whereby electrophoretic displays may be properly aligned and maximized with respect to contrast while manufacturing and assembling thereof at modest cost may be realized. Thus, while rather specific manufacturing details of the electrophoretic display contemplated herein have been set forth, the instant invention will have wide application to any form of manufacturing and assembling of these types of displays and are not limited to the specific manner of mating frame with display as described herein.

Although the instant invention has been described in connection with a highly specific exemplary embodiments thereof, it will be understood that many modifications and variations thereof will be readily apparent to those of ordinary skill in the art. Therefore, it is manifestly intended that this invention be only limited by the claims in the equivalence thereof.

What is claimed is:

1. Electrophoretic display panel apparatus comprising:
    a planar member;
    a first plurality of conductive lines deposited in a first direction on said planar member, each of said first plurality of conductive lines being disposed in parallel on said planar member;
    a second plurality of conductive lines disposed in a second direction on said planar member, said second direction being transverse to said first direction, each of said second plurality of conductive lines spacially crossing each of said first plurality of conductive lines to form a plurality of intersections therebetween and each of said second plurality of conductive lines including a plurality of commonly connected, parallel lines segments extending in said second direction to form a plurality of minor intersections with each of said first plurality of conductive lines at each of said plurality of intersections;
    means for insulating each of said plurality of commonly connected, parallel line segments in each of said second plurality of conductive lines from each of said first plurality of conductive lines; and
    means overlying said planar member and said first and second plurality of conductive lines for establishing a fluid tight panel, said means overlying creating a space above said planar member and said first and second plurality of conductive lines for maintaining an electrophoretic dispersion.

2. The electrophoretic display panel apparatus according to claim 1 wherein said means for insulating underlies said parallel line segments in each of said second plurality of conductive lines and establishes troughs intermediate adjacent parallel line segments, said troughs acting as wells from which and to which electrophoretic particles may displace.

3. The electrophoretic display panel apparatus according to claim 2 wherein said troughs are additionally established intermediate adjacent ones of said second plurality of conductive lines.

4. The electrophoretic display panel apparatus according to claim 1 wherein said planar member and said first plurality of conductive lines are substantially transparent.

5. The electrophoretic display panel apparatus according to claim 1 wherein said means overlying is substantially transparent.

6. The electrophoretic display panel apparatus according to claim 1 additionally comprising means for applying potential to each conductive line within said first and second pluralities of conductive lines.

7. The electrophoretic display panel apparatus according to claim 1 additionally comprising contact pad means formed at an end portion of each conductive line within said first and second pluralities of conductive lines.

8. The electrophoretic display panel apparatus according to claim 7 wherein said panel member is rectangular and exhibits first, second, third and fourth side portions and said contact pad means formed at end portions of each conductive line within said first plurality of conductive lines are exposed from and proximate to said first and second side portions and said contact pad means formed at end portions of each conductive line within said second plurality of conductive lines are exposed from and proximate to said third and fourth side portions.

9. The electrophoretic display panel apparatus according to claim 8 wherein said first and second pluralities of conductive lines each contain odd and even number conductive lines and said contact pad means formed at said end portions of each odd number conductive line within said first plurality of conductive lines is exposed from and proximate to said first side portion; said contact pad means formed at said end portions of each even number conductive line within said first plurality of conductive lines is exposed from and proximate to said second side portion, said contact pad means formed at said end portions of each odd number conductive line within said second plurality of conductive lines is exposed from and proximate to said third side portion and said contact pad means formed at said end portions of each even number conductive line within said second plurality of conductive lines is exposed from and proximate to said fourth side portion.

10. The electrophoretic display panel apparatus according to claim 7 additionally comprising means for selectively applying potential to each conductive line within said first and second pluralities of conductive lines, said means for selectively appying including means for establishing electrical contact to each of said contact pad means and means for selectively delaying potential applied to predetermined ones of said contact pad means to compensate for misalignment in established electrical contact to each of said contact pad means.

11. The elctrophoretic display panel apparatus according to claim 10 wherein said contact pad means for each conductive line within said first plurality of conductive lines are disposed in a pair of columns and said contact pad means for each conductive line within said second plurality of conductive lines are disposed in a pair of rows, said contact pad means within each pair of rows and columns being grouped according to an odd and even designation.

12. The electrophoretic display panel apparatus according to claim 11 wherein said means for selectively delaying potential applied to predetermined ones of said contact pad means is independently operative in respect to each column and row within said pairs of columns and rows.

13. The electrophoretic display panel apparatus according to claim 11 wherein said means for selectively applying potential acts when enabled to selectively apply potential in the form of One's and Zero's to each contact pad means in one row of said pair and a potential level to one contact pad means in said pair of columns.

14. The electrophoretic display panel apparatus according to claim 13 wherein said means for selectively delaying potential applied to predetermined ones of said contact pad means is independently operative in respect to each column and row within said pairs of columns and rows.

15. The electrophoretic display panel apparatus according to claim 14 wherein said means for insulating underlies said parallel line segments in each of said second plurality of conductive lines and establishes troughs intermediate adjacent parallel line segments, said troughs acting as wells from which and to which electrophoretic particles may displace.

16. The electrophoretic display panel apparatus according to claim 15 wherein said troughs are additionally established intermediate adjacent ones of said second plurality of conductive lines.

17. The electrophoretic display panel apparatus according to claim 16 wherein said planar member and said first plurality of conductive lines are substantially transparent.

18. The electrophoretic display panel apparatus according to claim 17 wherein said panel member is rectangular and exhibits first, second, third and fourth side portions and said contact pad means formed at end portions of each conductive line within said first pluraltiy of conductive lines are exposed from and proximate to said first and second side portions and said contact pad means formed at end portions of each conductive line within said second plurality of conductive lines are exposed from and proximate to said third and fourth side portions.

19. The electrophoretic display panel apparatus according to claim 18 wherein said first and second pluralities of conductive lines each contain odd and even numbered conductive lines and said contact pad means formed at said end portions of each odd number conductive line within said first plurality of conductive lines is exposed from and proximate to said first side portion; said contact pad means formed at said end portions of each even number conductive line within said first plurality of conductive lines is exposed from and proximate to said second side portion, said contact pad means formed at said end portions of each odd number conductive line within said second plurality of conductive lines is exposed from and proximate to said third side portion and said contact pad means formed at said end portions of each even number conductive line within said second plurality of conductive lines is exposed from and proximate to said fourth side portion.

20. Electrophoretic display panel apparatus comprising:
- a first plurality of conductive lines deposited in parallel on a planar member;
- a second plurality of conductive lines disposed in parallel on said planar member in a direction transverse to said first plurality of conductive lines, said second plurality of conductive lines being insulated from said plurality of conductive lines;
- means overlying said planar member and said first and second plurality of conductive lines for establishing a fluid tight panel, said means overlying creating a space above said planar member and said first and second plurality of conductive lines for maintaining an electrophoretic dispersion; and
- means for selectively applying write signals to said first and second plurality of conductive lines, said means for selectively applying including means for connecting said write signals to each of said first and second plurality of conductive lines, and means for selectively delaying write signals selectively applied to predetermined ones of said first and second plurality of conductive lines to compensate for misalignment in said means for connecting.

21. The electrophoretic display panel apparatus according to claim 20 wherein said means for selectively applying write signals acts to selectively apply write signals to selected ones of said first and second plurality of conductive lines at a predetermined clocking rate and said means for selectively delaying acts to selectively delay said write signals applied to predetermined ones of said first and second plurality of conductive lines by a selectable number of delay intervals defined by said clocking rate.

22. The electrophoretic display panel apparatus according to claim 21 wherein said means for selectively delaying includes a plurality of serial connected delay stages, each of said plurality of serial connected delay stages being configured to insert one delay interval in write signals selecively applied to said predetermined ones of said first and second plurality of conductive lines.

23. The electrophoretic display panel apparatus according to claim 22 wherein each of said delay stages includes switch means for selectively enabling the delay stage associated therewith to cause said delay interval to be inserted in write signals selectively applied to said predetermined ones of said first and second plurality of conductive lines.

24. The electrophoretic display panel apparatus according to claim 20 wherein said first and second plurality of conductive lines are each separately designated as odd and even conductive lines within said first and second plurality of conductive lines and said means for selectively applying write signals acts to selectively apply write signals alternatively to odd and even conductive lines within said second plurality of conductive lines.

25. The electrophoretic display panel apparatus according to claim 24 wherein said means for selectively delaying write signals includes at least a first delay circuit associated with said odd conductive lines and a second delay circuit associated with said even conductive lines.

26. The electrophoretic display panel apparatus according to claim 25 wherein said first delay circuit is activated if misalignment occurs with respect to said even conductive lines and said second delay circuit is activated if misalignment occurs with respect to said odd conductive lines.

27. The electrophoretic display panel apparatus according to claim 24 wherein said means for selectively applying write signals acts to selectively apply write signals to said odd and even conductive lines at a predetermined clocking rate and said means for selectively delaying acts to selectively delay said write signals selectively applied to said odd and even conductive lines by a selectable number of delay intervals defined by said clocking rate.

28. The electrophoretic display panel apparatus according to claim 27 wherein said means for selectively delaying write signals includes at least a first delay circuit associated with said odd conductive lines and a second delay circuit associated with said even conductive lines.

29. The electrophoretic display panel apparatus according to claim 28 wherein each of said first and second delay circuits includes a plurality of serial connected delay stages, each of said plurality of serial connected delay stages being configured to insert one delay interval in write signals selectively applied to said conductive lines.

30. The electrophoretic display panel apparatus according to claim 29 wherein said first delay circuit is activated if misalignment occurs with respect to said even conductive lines and said second delay circuit is activated if misalignment occurs with respect to said odd conductive lines.

31. The electrophoretic display panel apparatus according to claim 20 wherein each of said second plurality of conductive lines spacially cross each of said first plurality of conductive lines to form a plurality of intersections therebetween and each of said second plurality of conductive lines include a plurality of commonly connected, parallel line segments extending in said second direction to form a plurality of minor intersections with each of said first plurality of conductive lines at each of said plurality of intersections.

32. The electrophoretic display panel apparatus according to claim 31 wherein said second plurality of conductive lines are insulated from said first plurality of conductive lines by means for insulating, said means for insulating underlying said parallel line segments in each of said second plurality of conductive lines and establishing troughs intermediate adjacent parallel line segments, said troughs acting as wells from which and to which electrophoretic particles may displace.

33. The electrophoretic display panel apparatus according to claim 32 wherein said troughs are additionally established intermediate adjacent ones of said second plurality of conductive lines.

34. The electrophoretic display panel apparatus according to claim 33 wherein said means for selectively applying write signals acts to selectively apply write signals to selected ones of said first and second plurality of conductive lines at a predetermined clocking rate and said means for selectively delaying acts to selectively delay said write signals applied to predetermined ones of said first and second plurality of conductive lines by a selectable number of delay intervals defined by said clocking rate.

35. The electrophoretic display panel apparatus according to claim 33 wherein said first and second plurality of conductive lines are each separately designated as odd and even conductive lines within said first and second pluraltiy of conductive lines and said means for selectively applying write signals acts to selectively apply write signals alternatively to odd and even conductive lines within said second plurality of conductive lines.

36. The electrophoretic display panel apparatus according to claim 33 wherein said planar member and said first plurality of conductive lines are substantially transparent.

37. The electrophoretic display panel apparatus according to claim 33 additionally comprising contact pad means formed at an end portion of each conductive line within said first and second pluralities of conductive lines.

38. The electrophoretic display panel apparatus according to claim 35 wherein said means for selectively delaying write signals includes at least a first delay circuit associated with said odd conductive lines and a second delay circuit associated with said even conductive lines.

39. The electrophoretic display panel apparatus according to claim 38 wherein said first delay circuit is activated if misalignment occurs with respect to said even conductive lines and said second delay circuit is activated if misalignment occurs with respect to said odd conductive lines.

40. The electrophoretic display panel apparatus according to claim 35 wherein said means for selectively applying write signals acts to selectively apply write signals to said odd and even conductive lines at a predetermined clocking rate and said means for selectively delaying acts to selectively delay said write signals selectively applied to said odd and even conductive lines by a selectable number of delay intervals defined by said clocking rate.

41. The electrophoretic display panel apparatus according to claim 40 wherein said means for selectively delaying write signals includes at least a first delay circuit associated with said odd conductive lines and a second delay circuit associated with said even conductive lines.

42. The electrophoretic display panel apparatus according to claim 41 wherein each of said first and second delay circuits includes a plurality of serial connected delay stages, each of said plurality of serial connected delay stages being configured to insert one delay interval in write signals selectively applied to said conductive lines.

43. The electrophoretic display panel apparatus according to claim 42 wherein said first delay circuit is activated if misalignment occurs with respect to said even conductive lines and said second delay circuit is activated if misalignment occurs with respect to said odd conductive lines.

* * * * *